United States Patent
Morita et al.

(10) Patent No.: US 7,150,861 B2
(45) Date of Patent: Dec. 19, 2006

(54) CATALYST FOR PURIFICATION OF EXHAUST GASES AND PROCESS FOR PURIFICATION OF EXHAUST GASES

(75) Inventors: Atsushi Morita, Kakogawa (JP); Junji Okamura, Himeji (JP); Shinyuki Masaki, Himeji (JP); Noboru Sugishima, Himeji (JP); Motonobu Kobayashi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 566 days.

(21) Appl. No.: 10/247,376

(22) Filed: Sep. 20, 2002

(65) Prior Publication Data

US 2003/0092568 A1    May 15, 2003

(30) Foreign Application Priority Data

Sep. 28, 2001  (JP) .............................. 2001-302460
Jan. 15, 2002  (JP) .............................. 2002-006712

(51) Int. Cl.
B01J 23/58   (2006.01)
B01J 23/64   (2006.01)
B01J 21/06   (2006.01)
B01J 27/55   (2006.01)
B01D 53/56   (2006.01)
B01D 53/62   (2006.01)
B01D 53/94   (2006.01)

(52) U.S. Cl. .................. 423/213.5; 502/328; 502/330; 502/332; 502/325; 502/339

(58) Field of Classification Search ................ 423/247, 423/239.1, 237, 244.02; 502/325, 339, 344, 502/223, 328, 330, 332
See application file for complete search history.

(56) References Cited

U.S. PATENT DOCUMENTS

| 4,018,706 | A |   | 4/1977  | Inoue et al. |
| 5,254,797 | A |   | 10/1993 | Imoto et al. |
| 5,431,893 | A |   | 7/1995  | Hug et al. |
| 5,601,792 | A |   | 2/1997  | Hug et al. |
| 5,948,377 | A | * | 9/1999  | Sung ........................ 423/213.5 |
| 6,037,307 | A | * | 3/2000  | Campbell et al. ........... 502/325 |

(Continued)

FOREIGN PATENT DOCUMENTS

EP    0 275 620    7/1988

(Continued)

OTHER PUBLICATIONS

Handbook of Environmental Catalyst, ISBN 4-900830-88-7 C3043, NTS, Inc., Nov. 20, 2001 (with partial English translation).

(Continued)

*Primary Examiner*—Stuart L. Hendrickson
*Assistant Examiner*—Alvin T Raetzsch
(74) *Attorney, Agent, or Firm*—Roylance, Abrams, Berdo & Goodman, L.L.P.

(57) ABSTRACT

A catalyst for purification of CO-containing exhaust gases, includes a metal oxide as a support and a catalytic component A being supported thereon as a catalytic component and including a specific noble metal element; wherein the support includes a titanium-containing oxide as the metal oxide and is a monolithically molded type porous honeycomb support obtained by a process including the steps of extrusion-molding and then calcining materials of the support; and wherein the catalytic component A is distributed with a quantitatively great inclination toward surfaces of the catalyst. A process for purification of exhaust gases to remove CO therefrom, includes the step of bringing the exhaust gases into contact with the catalyst.

14 Claims, 3 Drawing Sheets

U.S. PATENT DOCUMENTS

| | | | |
|---|---|---|---|
| 6,150,299 A * | 11/2000 | Umemoto et al. | 502/304 |
| 6,214,307 B1 * | 4/2001 | Okumura et al. | 423/213.5 |
| 6,673,739 B1 * | 1/2004 | Yamazaki et al. | 502/216 |
| 6,777,370 B1 * | 8/2004 | Chen | 502/241 |
| 6,818,582 B1 * | 11/2004 | Maunula | 502/73 |

FOREIGN PATENT DOCUMENTS

| | | |
|---|---|---|
| GB | 1 368 661 | 10/1974 |
| JP | 091586/1975 | 7/1975 |
| JP | 53-89874 | 8/1978 |
| JP | 53-146991 | 12/1978 |
| JP | 59-142851 | 8/1984 |
| JP | 60-220148 | 11/1985 |
| JP | 62-027041 | 2/1987 |
| JP | 62-65721 | 3/1987 |
| JP | 62-183842 | 8/1987 |
| JP | 4-250851 | 9/1992 |
| JP | 6-4126 | 1/1994 |
| JP | 6-7643 | 1/1994 |
| JP | 7-241467 | 9/1995 |
| JP | 7-241468 | 9/1995 |
| JP | 8-299809 | 11/1996 |
| JP | 9-103648 | 4/1997 |
| JP | 9-103687 | 4/1997 |
| JP | 9-253491 | 9/1997 |
| JP | 9-308829 | 12/1997 |
| JP | 10-216519 | 8/1998 |
| JP | 10-235206 | 9/1998 |
| JP | 10-249198 | 9/1998 |
| JP | 2000-288347 | 10/2000 |
| JP | 2001-62292 | 3/2001 |

OTHER PUBLICATIONS

"Poisoning of Automotive Catalysts", SHELEF, Advances in Catalysis, vol. 27, 1978, pp. 311-333.

* cited by examiner

CATALYST FOR PURIFICATION OF EXHAUST GASES AND PROCESS FOR PURIFICATION OF EXHAUST GASES

BACKGROUND OF THE INVENTION

A. Technical Field

The present invention relates to a catalyst for purification of exhaust gases and a process for purification of exhaust gases. Specifically, the present invention aims at: a catalyst for purification of exhaust gases to efficiently purify carbon monoxide (CO) as contained in combustion exhaust gases as discharged from various combustion apparatuses such as boilers, gas turbines, diesel engines, and gas engines; and a process for purification of exhaust gases utilizing such a catalyst.

B. Background Art

The combustion exhaust gases, as discharged from various combustion apparatuses such as boilers, gas turbines, diesel engines, and gas engines, generally contain harmful components such as CO, $NO_x$, $SO_x$, and unburned-fuel-derived volatile organic compounds, though depending on such as their respective combustion apparatuses and operational conditions. As to these combustion apparatuses, there are many cases where combustion is carried out under conditions where the quantity of air as supplied during combustion is rendered larger than the theoretical air quantity necessary for perfect combustion of fuel gases in order that the combustion efficiency or thermal efficiency may be enhanced and further that the quantities of harmful components such as CO and $NO_x$ may efficiently be decreased. The quantities of the harmful components such as CO and $NO_x$ as contained in the combustion exhaust gases can considerably be decreased by such as the above control of the combustion state, but such as CO and $NO_x$ still remain on a level recognized as harmful. Therefore, these residual harmful components need to also efficiently be purified, so it becomes necessary to develop a catalyst for purification of exhaust gases and a process for purification of exhaust gases which are able to function effectively on a higher level of purification.

By the way, known as a catalyst for purification of exhaust gases is a catalyst comprising a metal oxide as a support and a catalytic component supported thereon wherein the catalytic component includes a noble metal element.

Examples of such a catalyst for purification of exhaust gases, comprising the metal-oxide-supported noble metal, include: those which have a structure as molded monolithically in the shape of such as a plate or honeycomb; and those which have a structure as supported on another framework structure including such as metals and/or cordierite; and such a catalyst is placed in a passageway of the exhaust gases. The exhaust gases flowing through comes into contact with the catalyst, so that harmful substances in the exhaust gases are catalyzed and thereby converted into harmless substances or into substances easy to make harmless or remove by post-treatment.

The catalyst for purification of exhaust gases, comprising the metal-oxide-supported noble metal, can display complex catalysis between the metal oxide and the noble metal and is therefore advantageous in that: when compared with catalysts for purification of exhaust gases comprising metal oxides alone, the harmful components in the exhaust gases can be purified with high efficiency, and the range of the kinds of harmful components possible to purify extends also. For example, JP-A-146991/1978 discloses catalysts for purification of exhaust gases comprising: binary composite oxides (e.g. Ti—Si-composite oxide) or trinary composite oxides; and noble metals such as Pt and Pd as supported on these composite oxides.

However, for the purpose of efficiently purifying the aforementioned residual harmful components, conventional catalysts for purification of exhaust gases comprising the metal-oxide-supported noble metal may be still unable to sufficiently display performance and function of demanded high levels. Thus, if usual, as to the metal-oxide-supported noble metal, if the quantity of the noble metal as supported is increased, the catalytic function is expected to be enhanced, but actually there are problems in that: if the quantity of the supported noble metal with a high unit cost is increased, the cost of materials as a whole greatly rises correspondingly thereto, so the economical performance is inferior, and besides, the enhancement of the purifiability on a high level is seen insufficiently for high cost. Furthermore, as to $SO_x$ often contained as harmful components in the exhaust gases, there are problems in that: there is seen a phenomenon such that, as the quantity of the supported noble metal in the catalyst is increased, the conversion of $SO_2 \rightarrow SO_3$ rather becomes higher, so $SO_3$ which causes such as corrosion of piping is formed in a large quantity.

SUMMARY OF THE INVENTION

A. Object of the Invention

Thus, an object of the present invention is to more enhance the efficiency of the purification of the CO-containing exhaust gases with the aforementioned catalyst for purification of exhaust gases comprising the metal-oxide-supported noble metal, particularly, to enable achievement of high purification efficiency without increasing the quantity of the supported noble metal as a catalytic component.

B. Disclosure of the Invention

As a result of diligent study to solve the above problems, the present inventors have completed the present invention by verifying that the above problems can be solved all at once if the following catalyst and process for purification of exhaust gases are used when purifying the CO-containing exhaust gases, wherein the catalyst is obtained by a process including the steps of: extrusion-molding and then calcining materials of a support containing what is called titanium-containing metal oxide such as titanium oxide and/or a composite oxide of metal elements including titanium as an essential component, thereby obtaining a monolithically molded type porous honeycomb support; and then supporting on this honeycomb support a catalytic component including a specific noble metal element in such a manner that the catalytic component will be distributed with a quantitatively great inclination toward surfaces of the finally obtained catalyst; and wherein the process for purification of exhaust gases comprises the step of bringing the CO-containing exhaust gases into contact with the above catalyst.

In addition, as to the occasion when CO-containing exhaust gases in which $NO_x$ are further contained are purified, the present inventors have found out that $NO_x$ can also efficiently be removed and purified along with CO if there is used a process comprising the step of bringing the above exhaust gases into contact with the above catalyst for purification of exhaust gases according to the present invention, or further comprising, before or after this contact step, the step of further bringing the above exhaust gases into contact with a catalyst for removal of nitrogen oxides (hereinafter, referred to as $DeNO_x$ catalyst) in the presence of a reducing agent; and thus the present inventors have completed the present invention by verifying that the above problems can be solved all at once by such a process.

That is to say, a catalyst for purification of exhaust gases, according to the present invention, is a catalyst for purification of CO-containing exhaust gases, and is characterized by comprising:

a metal oxide as a support and a catalytic component A being supported thereon as a catalytic component and including at least one noble metal element selected from the group consisting of Pt, Pd, Rh, Ru, Ir, and Au;

wherein the support includes, as the metal oxide, titanium oxide and/or a composite oxide of Ti and at least one metal element selected from the group consisting of Si, Al, W, and Zr and is a monolithically molded type porous honeycomb support obtained by a process including the steps of extrusion-molding and then calcining materials of the support; and wherein the catalytic component A is distributed with a quantitatively great inclination toward surfaces of the catalyst.

As to the above catalyst for purification of exhaust gases according to the present invention, there can be made any one or any combination of the following modifications:

the catalyst further comprises a catalytic component B including at least one metal element as included in groups I to III in a periodic table as another catalytic component supported on the support;

the catalyst further comprises a catalytic component C including at least one element selected from the group consisting of V, W, Mo, Cu, Mn, Ni, Co, Cr, and Fe as another catalytic component supported on the support;

the catalyst further comprises a compound of at least one element selected from the group consisting of B, P, Sb, Pb, Sn, Zn, and In in the range of not more than 10 weight % in terms of atom of the selected element relative to the entity of the catalyst; and the catalyst further comprises a sulfur compound in the range of not more than 1 weight % in terms of sulfur atom relative to the entity of the catalyst.

In addition, a process for purification of exhaust gases, according to the present invention, is a process for purification of exhaust gases to remove CO therefrom, and is characterized by comprising the step of bringing the exhaust gases into contact with the above catalyst for purification of exhaust gases according to the present invention.

As to the above process for purification of exhaust gases according to the present invention, the exhaust gases can further contain $NO_x$; and in the case where the exhaust gases further contains $NO_x$, it is favorable that the process further comprises the step of bringing the exhaust gases into contact with a $DeNO_x$ catalyst in the presence of a reducing agent before and/or after the step of bringing the exhaust gases into contact with the above catalyst for purification of exhaust gases according to the present invention.

Even if the exhaust gases are exhaust gases having a CO concentration of not higher than 100 ppm, the process for purification of exhaust gases according to the present invention can sufficiently remove this low-concentration CO.

These and other objects and the advantages of the present invention will be more fully apparent from the following detailed disclosure.

EXPLANATION OF THE SYMBOLS

Figure 1:
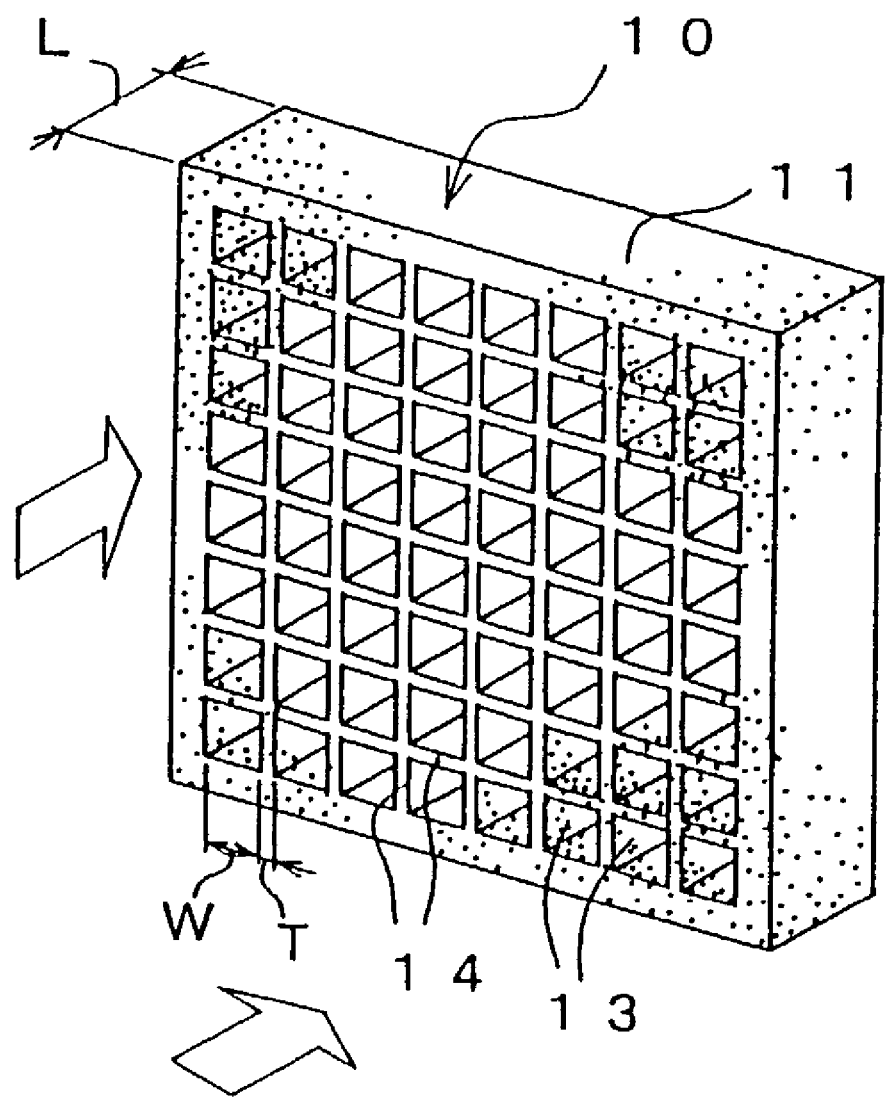
FIG. 1 is a perspective of a catalyst for purification of exhaust gases showing a mode for carrying out the present invention.

10: Catalyst for purification of exhaust gases
11: Porous honeycomb support
12: Supporting range
13: Exhaust gas passageway
14: Inner wall

DETAILED DESCRIPTION OF THE INVENTION

Hereinafter, detailed explanations are made about the catalyst and process for purification of exhaust gases according to the present invention, but the scope of the present invention is not bound to these explanations, and modes other than the below-mentioned examples can also be carried out fittingly within the range not damaging the spirit of the present invention.

(CO-Containing Exhaust Gases):

The catalyst for purification of exhaust gases and the process for purification of exhaust gases, according to the present invention, are applicable to carbon monoxide (CO)-containing exhaust gases as discharged from conventional various industrial apparatuses and facilities (hereinafter referred to as supplying sources), specifically, combustion exhaust gases from such as boilers, gas turbines, diesel engines, gas engines, heating furnaces, and various industrial processes.

Components, which are contained in the combustion exhaust gases, differ according to the aforementioned supplying sources and also to environmental conditions such as emission regulation. Specific examples of gas components which can have bad effects on environment, besides CO, include nitrogen oxides ($NO_x$) and sulfur oxides ($SO_x$).

In cases of the combustion exhaust gases, they may contain volatile organic compounds which are components derived from fuel but has not been burned, and their bad effects on environment are made problems of.

The catalyst for purification of exhaust gases, according to the present invention, is effective also for purification of the exhaust gases containing the above nitrogen oxides ($NO_x$) and/or volatile organic compounds in addition to CO, and further can suppress the $SO_2$-oxidizing ratio to low.

There are cases where the exhaust gases are subjected to various purification of exhaust gases before the purification step is carried out with the catalyst for purification of exhaust gases according to the present invention. Accordingly, there are cases where components of the exhaust gases in the stage of having been discharged from the aforementioned supplying sources are different from those in the stage of being subjected to purification of exhaust gases with the catalyst for purification of exhaust gases according to the present invention.

The catalyst for purification of exhaust gases and the process for purification of exhaust gases, according to the present invention, are effective also for low-concentration-CO-containing exhaust gases which are difficult to efficiently purify with conventional catalysts for purification of exhaust gases and conventional processes for purification of exhaust gases. Specifically, the catalyst for purification of exhaust gases and the process for purification of exhaust gases, according to the present invention, are effective even for exhaust gases having a CO concentration of not higher than 100 ppm.

As to the exhaust gases, the temperature conditions or the velocity varies with conditions of discharge from the aforementioned supplying sources or with hysteresis of till before the implementation of the purification of exhaust gases.

(Catalyst):

The catalyst according to the present invention comprises a support and a catalytic component wherein the catalytic component is supported on the support. Hereinafter, detailed explanations are made about them.

Support

The support, used for the catalyst for purification of exhaust gases according to the present invention, needs to include a titanium-containing oxide. The titanium-containing oxide referred to herein may be an oxide of Ti (titanium) alone (titanium oxide), or a composite oxide including a combination of Ti and at least one element selected from the group consisting of Si (silicon), Al (aluminum), W (tungsten), and Zr (zirconium). The titanium-containing oxide may be a mixture of this composite oxide (titanium-containing composite oxide) and the titanium oxide. Incidentally, the support may be a mixture of the above titanium-containing oxide with a non-titanium oxide usable for conventional supports, and examples of this non-titanium oxide include silica, alumina, silica-alumina, zirconia, and zeolite. Hereinafter, the "titanium-containing oxide" is referred to, inclusive also of such a mixed form.

In the above titanium-containing oxide, the Ti content is favorably in the range of 5 to 95 mol %, more favorably 20 to 95 mol %, relative to the total molar number of Ti and the other elements in the whole of the above titanium-containing oxide.

The support including the titanium-containing oxide not merely has the function of supporting the catalytic component, but also contributes to a function of keeping the supported state of the catalytic component, as supported on the titanium-containing oxide support, suitable for removal of CO, thereby enhancing the exhaust gas purification function of the catalytic component. As a result, high CO-removal efficiency is obtained without increasing the supported quantity of the catalytic component.

Particularly, the use of the Ti—Si-composite oxide has the advantage of giving what has a low $SO_2$-oxidizing ratio and is excellent in the exhaust gas purifiability.

The support, used for the catalyst for purification of exhaust gases according to the present invention, is a monolithically molded type porous honeycomb support obtained by a process including the steps of extrusion-molding and then calcining materials of the support.

In preparation for the titanium-containing oxide used as a material of the support, there can be adopted the same means as of conventional titanium-containing oxides, and examples thereof include techniques as disclosed in such as JP-A-146991/1978. Particularly, a technique as disclosed in the specification of Japanese Patent Application No. 2000-099593 (JP-A-062292/2001) as previously filed by the present applicant can be cited as a favorable technique.

As to raw materials for supplying the titanium-containing oxide used as a material of the support, a beforehand prepared titanium-containing oxide can be used as it is, and besides, compound materials which can produce the titanium-containing oxide by calcination can also be used. Specifically, both inorganic and organic compounds can be used, and usable examples thereof include hydroxides, ammonium salts, ammine complexes, oxalates, halides, sulfates, nitrates, carbonates, and alkoxides, all of which contain predetermined metals including Ti as an essential component.

The support, as used for the catalyst for purification of exhaust gases according to the present invention, is a honeycomb support and is therefore produced by a process including the steps of: molding the materials of the support containing the above titanium-containing oxide into a honeycomb form by extrusion molding; and then calcining the resultant molded structure; thereby forming a monolithically molded type porous honeycomb support.

Basically applicable to the above production process are the same production conditions as those for conventional porous honeycomb supports.

The materials of the support are extrusion-molded either in a state left as they are powdery, or in the form of such as a powder-dispersed slurry, with such as conventional extrusion molding apparatuses. Setting of the die shape of the extrusion molding apparatuses can adjust the shape and measurements and the inner wall thickness of the aimed gas passageways.

The molded product from the extrusion-molding is cut every predetermined length, thus obtaining the extrusion-molded structure. A change of the cutting interval can adjust the length of the porous honeycomb support.

The extrusion-molded structure is dried and/or aged, if necessary, and then calcined with such as calcination furnaces, thus obtaining the honeycomb support. The treatment conditions such as calcination temperature and calcination time can be set in the same range as that for production of conventional supports.

The honeycomb support obtained in this way is a porous support.

The porous support is a support of the porous structure having fine pore spaces. The porous support can support the catalytic component not only on its outer surfaces but also inside the fine pore spaces. The contact area between the exhaust gases and the catalytic component is so large that the purification reaction is efficiently carried out.

If the titanium-containing oxide is contained in materials of the support, the function of adsorbing and retaining the exhaust gas components in the porous structure is well displayed. Not only on outer surfaces of the support but also inside the porous structure of the support, the supported catalytic component and the titanium-containing oxide synergistically function to efficiently achieve the purification of exhaust gases.

The honeycomb support is such that a plurality of gas passageways through which the exhaust gases pass are arranged lengthwise and crosswise. The gas passageways are partitioned off by comparatively thin inner walls. The honeycomb support is what is called a honeycombed support. Specifically, it has such a structure as illustrated by FIG. 1.

As to the sectional shape of the gas passageways, not only hexagons similar to honeycombs but also squares, rectangles, and other polygons are adoptable. There is also a case where curved shapes such as circles and ovals are included.

The measurements of the gas passageways differ also according to conditions such as the quantity of the exhaust gases being passed and the purifiability. Fittingly for the purpose, there can be set such as the one-edge length W (which may be referred to as "(mesh) opening size") of the gas passageways, the inner wall thickness T, the opening ratio, the length of the gas passageways (i.e. the length L of the porous honeycomb support in a direction parallel to an exhaust gas flow direction during the use), and the number of the gas passageways.

The gas passageways may be arranged lengthwise and crosswise in the form of a straight lattice, or can also be arranged in the form of hound's tooth or spirally.

As to the sectional shape of the whole porous honeycomb support, squares, rectangles, and other polygons are adopted. Curved shapes such as circles are also adoptable.

The porous honeycomb support is more excellent in respect to the catalyst-supporting function and the catalytic activity than a sintered honeycomb support (including such as cordierite) conventionally known as a catalyst support. The sintered honeycomb support is a sintered structure as sintered usually in the range of about 1,200 to about 1,450° C., and is in the form of so well-sintered-and-set porcelain as to have an extremely small specific surface area. However, the porous honeycomb support, according to the present invention, is a product obtained by calcination at a comparatively low calcination temperature, specifically, in the range of 200 to 600° C., and has a porous structure of the large specific surface area throughout the entirety of from surface to inside of the support. As a result, the porous honeycomb support can support the catalytic component much inside the porous structure, so it becomes possible to obtain a honeycomb-shaped catalyst having high catalytic activity. As to the conventional sintered honeycomb support, the porous structure is absent, or slightly present even if any, inside the support, so the catalytic component cannot be supported much inside the support, and the catalytic activity cannot be displayed enough.

The porous honeycomb support, as referred to in the present invention, is a monolithically molded type honeycomb support and is therefore very excellent in the exhaust gas purification efficiency. Specifically, the porous honeycomb support, as referred to in the present invention, is not a honeycomb support obtained by such as a process in which: a framework structure made of metals and/or cordierite for forming a honeycomb structure is separately used besides materials of the support, and surfaces of the above framework structure are coated with the above materials of the support; but a honeycomb support obtained by a process involving molding the materials themselves of the support into a honeycomb form basically without using the above framework structure, so the exhaust gases being purified can pass not only through the finely partitioned gas passageways from the gas inlet side to the gas outlet side but also through the inner wall portions which partition the gas passageways off. As to the honeycomb support having the above framework structure, the exhaust gases do not pass through the inner wall portions in this way, whereas, as to the monolithically molded type honeycomb support, the purification efficiency can be more enhanced correspondingly to the passage of the exhaust gases through the inner wall portions.

Catalytic Components and Supporting Thereof (Catalytic Component A)

As to the catalyst for purification of exhaust gases according to the present invention, as the catalytic component A there is used a catalytic component including a noble metal element. As the noble metal element, for specific example, there is used at least one member selected from the group consisting of Pt, Pd, Rh, Ru, Ir, and Au. The catalytic component A may be a metal including the above noble metal element, or such as a compound (e.g. oxide) thereof.

Usable as raw materials for supplying the catalytic component A are materials utilized for such as production of conventional catalysts. Specific examples thereof include nitrates, halides, ammonium salts, ammine complexes, and hydroxides.

As to means for supporting the catalytic component A on the support, basically, there can be adopted those which are common to conventional metal-oxide-supported noble metal catalysts. In the treatment step of supporting the catalytic component A on the support, arrangements are made to support the catalytic component A in the form distributed with a quantitatively great inclination toward the neighborhood of outer surfaces (specifically, the outer surfaces and/or the inside near the outer surfaces) of the support in a high concentration.

In the case where the catalyst and the exhaust gases are brought into contact with each other at a high space velocity (SV) to remove the CO from the exhaust gases, most of the purification action by the catalyst can be considered to occur in surface layer portions of the catalyst. In such a case, the efficiency of the purification of the exhaust gases with the catalyst can be enhanced by supporting the catalytic component A in the form distributed with a quantitatively great inclination toward the catalyst surface layer portions with which the exhaust gases come into contact.

The quantity of the supported catalytic component A differs according to such as combinations of materials or treatment conditions of supporting treatment, but usually the catalytic component A is used in the range of 0.005 to 2.0 weight %, favorably 0.01 to 1.0 weight %, of the entirety of the catalyst. The reason therefor is as follows. In the case where the quantity of the supported catalytic component A is too small, the catalytic activity is low. Also in the case where the quantity of the supported catalytic component A is too large, the effect is hopeless of enhancement of the activity, and the economical performance is merely damaged, and further, there occur unfavorable effects such that the conversion of $SO_2 \rightarrow SO_3$ is high.

The catalytic component A is usually supported in the form of particles on the support. As to particle diameters of the catalytic component A, those which have an average particle diameter of not larger than 30 nm are favorable. More favorably, the average particle diameter is not larger than 20 nm. The smaller the particle diameters of the catalytic component A are and the higher the degree of the dispersed state of the catalytic component A is, the higher the activity becomes.

(Catalytic Component B)

As to the catalyst for purification of exhaust gases according to the present invention, as the catalytic component B there can further be used a catalytic component including at least one element as included in groups I to III in a periodic table. Specific examples of the element as included in groups I to III in a periodic table include Na, Li, Mg, Ca, Y, Ce, and La. The catalytic component B may be a metal including the above element as included in groups I to III in a periodic table, or such as a compound (e.g. oxide) thereof.

If the catalyst further comprising the catalytic component B as another catalytic component is used, then the purifiability becomes better than in the case of supporting the catalytic component A alone, so the quantity of the catalytic component A as used can effectively be decreased. In addition, at the same time, the coexistence of the catalytic component B in the catalyst suppresses the oxidation of $SO_2$, and also enhances the resistance to the $SO_X$ and the heat resistance, so that it is possible to maintain the purification efficiency stably for a long term even if the quantity of the supported catalytic component A is small.

Raw materials for supplying the catalytic component B are not especially limited, and at least one materials as utilized for such as production of conventional catalysts are usable, but favorable examples thereof include those which contain organic components (e.g. organic acids) in their molecules, such as organic acid salts, alkoxides, and organometallic complexes.

The process for supporting the catalytic component B is not especially limited, either, and the catalytic component B can be supported by processes as utilized for production of conventional catalysts.

The quantity of the supported catalytic component B is favorably in the range of not larger than 20 weight %, more favorably 0.01 to 20 weight %, still more favorably 0.1 to 10 weight %, of the entirety of the catalyst. In the case where the quantity of the supported catalytic component B is too small, the above effect peculiar to the catalytic component B is not obtained. Even if the quantity of the supported catalytic component B is increased to larger than the above ranges, the effect is hopeless of enhancement of the activity, and the activity may inversely be deteriorated.

There is no especial limitation with regard to the supporting order, either. The catalytic component B may be supported any time of following, preceding, and simultaneously with the catalytic component A. Above all, it is favorable to support the catalytic component B following or simultaneously with the catalytic component A.

(Supporting of Catalytic Components A and B):

The catalyst for purification of exhaust gases, according to the present invention, comprises supporting of the above catalytic component A and, if necessary, the above catalytic component B, thereby having the aforementioned functions and effects. In each of cases where the supported state of the catalytic component A and the supported state of the catalytic component B are further combined in the following ways, there are peculiar functions and effects. Specific examples of the above cases include the following: 1) a case where the catalytic components A and B are both distributed with a quantitatively great inclination toward surfaces of the catalyst; and 2) a case where the catalytic component A is distributed with a quantitatively great inclination toward surfaces of the catalyst, whereas the catalytic component B is present quantitatively substantially evenly throughout the whole catalyst. Incidentally, explanations are hereinafter made about the supported state of being distributed with a quantitatively great inclination toward surfaces and the quantitatively substantially evenly supported state, but the explanations of such as supporting quantity are made independently of each other as to the catalytic components A and B.

That is to say, for the catalytic component to be distributed with a quantitatively great inclination toward surfaces of the catalyst (distribution inclined quantitatively greatly toward surfaces), it is enough that, in the catalyst resultant from supporting of the catalytic component in surfaces of the support and/or in the neighborhood of those surfaces, the catalytic component is present in surface layers of this catalyst or present in the neighborhood of surfaces of this catalyst with the distribution range being wide to some degree in a direction deeper than the above surface layers, so there is no especial limitation. For specific example, in a drawing figure (graph) showing the relation between the sectional thickness direction of the inner wall portions of the honeycomb-shaped catalyst and the X-ray intensity I characteristic of the catalytic component A or B as obtained by continuously measuring (carrying out linear analysis measurement of) an inner wall portion of the honeycomb-shaped catalyst as to the designated catalytic component in a direction from an outer surface of the inner wall portion toward its opposite outer surface with an electron probe microanalyzer (EPMA), when the integrated value of the X-ray intensity I throughout the whole of the sectional thickness T of the aforementioned inner wall portions is represented by $N_0$ and when the integrated value of the X-ray intensity I of from outer surfaces of the inner wall portions to portions of the depth of T/4 in a direction toward the inside of the inner wall portions is represented by N, then $70 \leq (N/N_0 \times 100)$ is favorable, and $80 \leq (N/N_0 \times 100)$ is more favorable, and $90 \leq (N/N_0 \times 100)$ is still more favorable, and $95 \leq (N/N_0 \times 100)$ is particularly favorable.

More specifically, for example, favorably not less than 70 weight % (more favorably not less than 80 weight %, still more favorably not less than 90 weight %, particularly favorably not less than 95 weight %) of the total quantity of the catalytic component, as supported on the honeycomb support, is distributed with a quantitatively great inclination toward the range of from outer surfaces to a depth of 100 µm in the catalyst. Defining the quantity of the existence in the range of from outer surfaces to a depth of 100 µm in the catalyst in this way is favorable for the case where the inner wall thickness of the honeycomb-shaped catalyst is not less than 0.3 mm, more favorably in the range of 0.3 to 1.0 mm, still more favorably in the range of 0.3 to 0.6 mm.

On the other hand, that the catalytic component is present quantitatively substantially evenly throughout the whole catalyst is not limited to that the catalytic component is present in a quantitatively completely evenly distributed state throughout the whole catalyst, but, for example, the catalytic component may be distributed in the range of the neighborhood of surfaces more than average, or otherwise the catalytic component may be distributed inside the catalyst more than in its surfaces. In short, a form of the presence other than the above distribution inclined quantitatively greatly toward surfaces is enough. Specifically making mention with the above definition for No and N, this other form of the presence is shown by $(N/N_0 \times 100) < 70$ and, favorably for being said to be quantitatively evener, $(N/N_0 \times 100) < 65$, more favorably $(N/N_0 \times 100) < 60$. Specifically making mention in the same way as of the case of the distribution inclined quantitatively greatly toward surfaces, the ratio of the catalytic component existing in the range of from outer surfaces to a depth of 100 µm in the catalyst relative to the total quantity of the catalytic component, as supported on the honeycomb support, is less than 70 weight % and, favorably for being said to be quantitatively evener, less than 65 weight %, more favorably less than 60 weight %.

As to the case where the catalytic components A and B are both distributed with a quantitatively great inclination toward surfaces of the catalyst, there are the following functions and effects. The CO-removing reaction mainly occurs in surfaces of the catalyst. Therefore, if arrangements are made in such a manner that the catalytic component A (which is a noble metal) and the catalytic component B (which is an element as included in groups I to III in a periodic table) can be both distributed with a quantitatively great inclination toward surfaces, even if the supporting quantity is the same, then the reaction efficiency can greatly be enhanced, and the economical performance is also excellent. In addition, the catalytic component B can enhance the CO-removing activity of the catalytic component A by what is called promoter effect.

As to the case where the catalytic component A is distributed with a quantitatively great inclination toward surfaces of the catalyst, whereas the catalytic component B is present quantitatively substantially evenly throughout the whole catalyst, then there are the following functions and effects. That is to say, the achievement of high CO-removing activity usually requires the catalyst to have high oxidizability, but demanded is selectivity such that the $SO_2$-oxidizing ($SO_2 \rightarrow SO_3$) activity is desired to be suppressed to as low as possible. In addition, the element as included in groups I to III in a periodic table can effectively scavenge $SO_x$, and is therefore considered to consequently be also able to suppress the $SO_2$-oxidizing activity. The CO-removing reaction mainly occurs in surfaces of the catalyst, and the oxidation reaction of $SO_2$ can occur also inside the catalyst. Therefore, if the catalytic component A (which is a noble metal) is caused to be distributed with a quantitatively great inclination toward surfaces, whereas the catalytic component B (which is an element as included in groups I to III in a periodic table) is caused to exist quantitatively substantially evenly throughout the whole catalyst, then the above selectivity as demanded to the catalyst can efficiently be enhanced.

In the present invention, the catalytic component A may be supported in the form distributed with a quantitatively great inclination toward surfaces of the catalyst, whereas the catalytic component B may be supported in the form either distributed with a quantitatively great inclination toward surfaces of the catalyst or existing quantitatively substantially evenly throughout the whole catalyst. However, hereinafter, explanations are made about both of these supported states of the distribution inclined quantitatively greatly toward surfaces and the quantitatively substantially even existence.

As to treatment processes for supporting the catalytic components A and/or B on the support, although there is no especial limitation, for example, a supporting technique by impregnation (impregnation of a solution or mixed solution (impregnation solution) containing the raw materials for supplying the catalytic components (hereinafter such raw materials are also referred to simply as catalytic components)) is favorably applicable thereto. In the case where the catalytic component is supported by the impregnation, the catalytic component is, for example, supported by chemical or physical adsorption. However, whether the supporting of the catalytic component is carried out by chemical adsorption or by physical adsorption is determined by how the kinds of the support and of the catalytic component being adsorbed are selected and combined, for specific example, as follows: in the case where the support is a titanium-containing oxide including such as oxides of silicon, aluminum, tungsten, and zirconium and where the catalytic component is hexaammineplatinum hydroxide, the treatment is mainly carried out by chemical adsorption; and in the case where the support is a titanium-containing oxide including such as oxides of silicon, aluminum, tungsten, and zirconium and where the catalytic component is an acetate of an element as included in groups I to III in a periodic table, the treatment is mainly carried out by physical adsorption.

Generally, in the case of the chemical adsorption, the support and the catalytic component are strongly bonded to each other, so, once the adsorption is achieved, the migration of the catalytic component from the support is difficult to occur. Accordingly, in the case where the support is impregnated with the impregnation solution containing the catalytic component (for example, in the case where the support is impregnated with such as an aqueous solution in which the catalytic component is dissolved), the adsorption usually runs precedently from surfaces of the catalyst either with the progress of the absorption of the impregnation solution or by attainment of the catalytic component (as diffused in the impregnation solution (also including that before being adsorbed by the support)) to absorption sites of the support, so that the migration of the catalytic component is difficult to cause by subsequent drying. Thus, in the case where the catalytic component is caused to be distributed with a quantitatively great inclination toward surfaces, it is, for example, enough to shorten the impregnation time, whereas, in the case where the catalytic component is caused to exist quantitatively substantially evenly throughout the whole catalyst, it is, for example, enough to lengthen the impregnation time. That is to say, as to the supporting of the catalytic component by the chemical adsorption, it can be considered that the supported state of such as whether the catalytic component is caused to be distributed with a quantitatively great inclination toward surfaces or to exist quantitatively substantially evenly is influenced to some degree also by drying conditions, but much by impregnation conditions such as the impregnation time.

Generally, in the case of the physical adsorption, the bonding between the support and the catalytic component is weaker than in the case of the chemical adsorption. Accordingly, in the case where the support is impregnated with the impregnation solution containing the catalytic component (for example, in the case where the support is impregnated with such as an aqueous solution in which the catalytic component is dissolved), the catalytic component can be caused to exist throughout the whole catalyst with the progress of the absorption of the impregnation solution, but the catalytic component also easily migrates along with migration of such as water by drying in the subsequent drying step. Thus, in the case where the catalytic component is caused to be distributed with a quantitatively great inclination toward surfaces, it is favorable to moderately shorten the impregnation time and further, if possible, to cause the catalytic component to migrate toward surfaces of the catalyst along with water by quick drying after the impregnation. On the other hand, in the case where the catalytic component is caused to exist quantitatively substantially evenly throughout the whole catalyst, it is favorable to moderately lengthen the impregnation time and further to inhibit the migration of the catalytic component by moderating the migration of water by slow drying after the impregnation. That is to say, as to the supporting of the catalytic component by the physical adsorption, it can be considered that the supported state of such as whether the catalytic component is caused to be distributed with a quantitatively great inclination toward surfaces or to exist quantitatively substantially evenly is usually more influenced by drying conditions, though depending on the balance between impregnation conditions, such as the impregnation time, and drying conditions.

Hereinafter, detailed explanations are made about conditions in the case of supporting the catalytic component by the chemical adsorption.

In the treatment of supporting the catalytic components A and/or B by the chemical adsorption, first, the support is impregnated with an impregnation solution containing the catalytic components A and/or B in a heated state. By this impregnation, the chemical adsorption is efficiently done to facilitate the supporting. Specifically, it is favorable to heat the temperature of the impregnation solution containing the catalytic components A and/or B to not lower than 40° C., more favorably not lower than 50° C., or not lower than 60° C., or not lower than 70° C., or not lower than 80° C., or not lower than 90° C. In the case where the temperature of the impregnation solution is too low, it may be impossible to support a desired quantity of catalytic component.

Examples of conditions in carrying out the impregnation include: impregnation time; pH of the impregnation solution; concentrations of the catalytic components in the impregnation solution; and impregnation temperature (temperature of the impregnation solution). Above all, the impregnation time is important. The impregnation time is defined as a time of from the initiation of the impregnation of the support with the impregnation solution, containing the catalytic component, till the end of the impregnation (separation of the support from the impregnation solution) (hereinafter the same).

Although there is no especial limitation with regard to the impregnation time, in the case where the catalytic component is caused to be distributed with a quantitatively great inclination toward surfaces of the catalyst, the impregnation time is favorably not longer than 10 minutes, more favorably not longer than 5 minutes, still more favorably not longer than 3 minutes. In the case where the impregnation time is longer than 10 minutes, it may be impossible to successfully cause the catalytic component to be distributed with a quantitatively great inclination toward surfaces of the catalyst. On the other hand, in the case where the catalytic component is caused to exist quantitatively substantially evenly throughout the whole catalyst, the impregnation time is favorably not shorter than 15 minutes, more favorably not shorter than 20 minutes, still more favorably not shorter than 30 minutes. In the case where the impregnation time is shorter than 15 minutes, it may be impossible to successfully cause the catalytic component to exist quantitatively substantially evenly throughout the whole catalyst.

In a period of from after the above impregnation step till before the below-mentioned drying step, a leaving-alone time may fittingly be provided, if necessary. Particularly, in the case where the catalytic component is desired to exist quantitatively substantially evenly throughout the whole catalyst, it may become effective to not only carry out the impregnation under the above favorable impregnation conditions but also provide a time to leave the impregnated product alone thereafter.

After being impregnated with the impregnation solution containing the catalytic component in the above way (or after the above leaving-alone time if this time is provided in the period of from after the impregnation step till before the drying step), such as the support is dried. Hereupon, in the case where the catalytic component is caused to be distributed with a quantitatively great inclination toward surfaces of the catalyst, it is favorable, for facilitation of the distribution of the catalytic component with a quantitatively great inclination toward surfaces of the support, that the drying of the support following the impregnation is quickly carried out, if necessary. However, there is no especial limitation. Specifically, the drying time (time of from the initiation of the drying till the substantial end of the drying) is favorably not longer than 1 hour, more favorably not longer than 30 minutes, still more favorably not longer than 20 minutes. Under conditions where the drying time is longer than 1 hour, it may be impossible to successfully cause the catalytic component to be distributed with a quantitatively great inclination toward surfaces of the catalyst. In addition, the drying temperature is favorably in the range of 60 to 300° C., more favorably 100 to 200° C. In the case where the drying temperature is lower than 60° C., there is a possibility that the drying may not sufficiently be done within the above favorable range of the drying time. In the case where the drying temperature is higher than 300° C., there may occur unfavorable effects such that the catalytic activity is deteriorated. On the other hand, in the case where the catalytic component is caused to exist quantitatively substantially evenly throughout the whole catalyst, it is favorable, for facilitating the quantitatively substantially even existence of the catalytic component throughout the whole catalyst by sufficiently impregnating the catalytic component up to inside the support, that the support is slowly dried spending time, if necessary. However, there is no especial limitation. Specifically, the drying time (time of from the initiation of the drying till the substantial end of the drying) is favorably not shorter than 2 hours, more favorably not shorter than 3 hours, still more favorably not shorter than 5 hours. In the case where the drying time is shorter than 2 hours, there may occur the above migration of the catalytic component to surfaces of the catalyst, resulting in being distributed with a quantitatively great inclination toward surfaces of the catalyst. In addition, the drying temperature is favorably in the range of 10 to 200° C., more favorably 20 to 150° C. In the case where the drying temperature is lower than 10° C., the drying may result in spending time more than necessary. In the case where the drying temperature is higher than 200° C., the drying may result in being done outside the above favorable range of the drying time, and there may occur the above migration of the catalytic component to surfaces of the catalyst, resulting in being distributed with a quantitatively great inclination toward surfaces of the catalyst.

In the chemical adsorption, the drying may be carried out either by air-blow drying or windless drying in any of the above cases, and is therefore not especially limited. However, it is usually favorable that the drying is carried out by the air-blow drying in the case where the catalytic component is caused to be distributed with a quantitatively great inclination toward surfaces of the catalyst, and by the windless drying in the case where the catalytic component is desired to exist quantitatively substantially evenly throughout the whole catalyst. Thus, in the case where the air-blow drying is carried out for the purpose of causing the catalytic component to be distributed with a quantitatively great inclination toward surfaces of the catalyst, it is enough that the linear velocity of the blowing is set fittingly for satisfying such as the desired drying time, so there is no especial limitation. However, specifically, the linear velocity is favorably in the range of 0.5 to 50 m/s, more favorably 1 to 30 m/s, still more favorably 2 to 20 m/s. In the case where the linear velocity is less than 0.5 m/s, it may be impossible to successfully cause the catalytic component to be distributed with a quantitatively great inclination toward surfaces of the catalyst. In the case where the linear velocity is more than 50 m/s, large apparatuses uneconomically becomes necessary, and further the catalyst may be destroyed. Incidentally, the value of the linear velocity on the occasion of the air-blow drying is defined as a value obtained by dividing the blowing gas flow rate ($m^3/s$) by the sectional area ($m^2$) of a portion, packed with the catalyst, of a drying apparatus (wherein the sectional area is defined as that in a state as not packed with the catalyst, that is, what is called blank sectional area).

Hereinafter, detailed explanations are made about conditions in the case of supporting the catalytic component by the physical adsorption.

Examples of conditions in carrying out the impregnation include: impregnation time; and concentrations of the catalytic components in the impregnation solution. Above all, the impregnation time is particularly important.

Although there is no especial limitation with regard to the impregnation time, in the case where the catalytic component is caused to be distributed with a quantitatively great inclination toward surfaces of the catalyst, the impregnation time is favorably not longer than 2 minutes, more favorably not longer than 1 minute, still more favorably not longer than 30 seconds. If the impregnation time is within the above range, it is possible to more successfully cause the catalytic component to be distributed with a quantitatively great inclination toward surfaces of the catalyst. On the other hand, in the case where the catalytic component is caused to exist quantitatively substantially evenly throughout the whole catalyst, the impregnation time is favorably not shorter than 1 minute, more favorably not shorter than 2 minutes, still more favorably not shorter than 5 minutes. In the case where the impregnation time is shorter than 1 minute, it may be impossible to successfully cause the catalytic component to exist quantitatively substantially evenly throughout the whole catalyst.

In a period of from after the above impregnation step till before the below-mentioned drying step, a leaving-alone time may fittingly be provided, if necessary. Particularly, in the case where the catalytic component is desired to exist quantitatively substantially evenly throughout the whole catalyst, it may become effective to not only carry out the impregnation under the above favorable impregnation conditions but also provide a time to leave the impregnated product alone thereafter.

After being impregnated with the impregnation solution containing the catalytic component in the above way (or after the above leaving-alone time if this time is provided in the period of from after the impregnation step till before the drying step), such as the support is dried. Hereupon, in the case where the catalytic component is caused to be distributed with a quantitatively great inclination toward surfaces of the catalyst, it is favorable, for facilitation of the distribution of the catalytic component with a quantitatively great inclination toward surfaces of the support by migration of the catalytic component to surfaces of the support along with migration of such as water toward surfaces of the catalyst in this drying step, that the drying of the support following the impregnation is quickly carried out. Specifically, the drying time (time of from the initiation of the drying till the substantial end of the drying) is favorably not longer than 30 minutes, more favorably not longer than 20 minutes, still more favorably not longer than 10 minutes. In the case where the drying time is longer than 30 minutes, there is a possibility that: the catalytic component cannot be caused to be distributed with a sufficiently great inclination toward surfaces of the catalyst, because the catalytic component cannot successfully be caused to migrate toward surfaces of the catalyst, or because the catalytic component is more impregnated into the catalyst. In addition, the drying temperature is favorably in the range of 80 to 300° C., more favorably 100 to 200° C. In the case where the drying temperature is lower than 80° C., there is a possibility that the drying may not sufficiently be done within the above favorable range of the drying time. In the case where the drying temperature is higher than 300° C., there may occur unfavorable effects such that the catalytic activity is deteriorated. On the other hand, in the case where the catalytic component is caused to exist quantitatively substantially evenly throughout the whole catalyst, it is favorable, for easily maintaining the state of the sufficient impregnation of the catalytic component up to inside the support and, as a result, facilitating the quantitatively substantially even existence of the catalytic component throughout the whole catalyst, that the support is slowly dried spending time. Specifically, the drying time (time of from the initiation of the drying till the substantial end of the drying) is favorably not shorter than 3 hours, more favorably not shorter than 5 hours, still more favorably not shorter than 10 hours. In the case where the drying time is shorter than 3 hours, it may be impossible to cause the catalytic component to exist quantitatively substantially evenly throughout the whole catalyst, for the reason such that there may occur the above migration of the catalytic component to surfaces of the catalyst, resulting in being distributed with a quantitatively great inclination toward surfaces of the catalyst. In addition, the drying temperature is favorably in the range of 10 to 150° C., more favorably 20 to 120° C. In the case where the drying temperature is lower than 10° C., the drying may result in spending time more than necessary. In the case where the drying temperature is higher than 150° C., there may occur the above migration of the catalytic component to surfaces of the catalyst, resulting in being distributed with a quantitatively great inclination toward surfaces of the catalyst.

In the physical adsorption, the drying may be carried out either by air-blow drying or windless drying in any of the above cases, and is therefore not especially limited. However, it is usually favorable that the drying is carried out by the air-blow drying in the case where the catalytic component is caused to be distributed with a quantitatively great inclination toward surfaces of the catalyst, and by the windless drying in the case where the catalytic component is desired to exist quantitatively substantially evenly throughout the whole catalyst. Thus, in the case where the air-blow drying is carried out for the purpose of causing the catalytic component to be distributed with a quantitatively great inclination toward surfaces of the catalyst, it is enough that the linear velocity of the blowing is set fittingly for satisfying such as the desired drying time, so there is no especial limitation. However, specifically, the linear velocity is favorably in the range of 1 to 50 m/s, more favorably 2 to 30 m/s, still more favorably 5 to 20 m/s. In the case where the linear velocity is less than 1 m/s, it may be impossible to successfully cause the catalytic component to be distributed with a quantitatively great inclination toward surfaces of the catalyst. In the case where the linear velocity is more than 50 m/s, large apparatuses uneconomically becomes necessary, and further the catalyst may be destroyed. Incidentally, the definition of the value of the linear velocity on the occasion of the air-blow drying is the same as that in the case of the above chemical adsorption.

With regard to treatment processes for supporting the catalytic component on the support, particularly in the case where the catalytic component is desired to exist quantitatively substantially evenly throughout the whole catalyst, besides the above treatment processes for supporting by impregnation there can be cited the following processes: ① a process including the step of mixing a powder or slurry of a component of the support (or a compound to form the component of the support by calcination) with a powder of the catalytic component, a solution containing the catalytic component, or a mixed solution containing the catalytic components; and ② a process including the steps of mixing together a solution of a component of the support (or a compound to form the component of the support by calcination) and a solution containing the catalytic component, and then forming a coprecipitate. By these processes, the catalytic component can be caused to quantitatively almost substantially evenly be supported even if such as drying conditions which are considerable conditions as to the above treatment processes for supporting by impregnation are not controlled or regulated. Specifically, in the case where the catalytic component B is caused to quantitatively substantially evenly be supported and where the catalytic component A is caused to be distributed with a quantitatively great inclination toward surfaces, it is enough that: a powder or slurry containing a component of the support (or a compound to form the component of the support by calcination) and the catalytic component B is prepared and molded, and then dried and calcined, and then on surfaces of the calcined product there is supported the catalytic component A by such as the above treatment processes for supporting by impregnation.

(Catalytic Component C)

The catalyst for purification of exhaust gases, according to the present invention, can be caused to further contain a catalytic component including at least one element selected from the group consisting of V, W, Mo, Cu, Mn, Ni, Co, Cr, and Fe as the catalytic component C. The catalytic component C may be a metal including the above various elements, or such as a compound (e.g. oxide) thereof. It is favorable to make the catalytic component C contained in the range of not more than 10 weight %, more favorably 0.01 to 10 weight %, in terms of atom of the above various elements (V, W, Mo, Cu, Mn, Ni, Co, Cr, and Fe) relative to the entity of the catalyst. The addition of the catalytic component C can more enhance the efficiency of the purification of the low-concentration-CO-containing exhaust gases, or give the nitrogen oxides ($NO_x$) removal function.

Raw materials for supplying the catalytic component C are not especially limited, and at least one materials as utilized for production of conventional catalysts are usable. There is no especial limitation with regard to the supporting process, either, and the catalytic component C can be supported on the support by processes as utilized for production of conventional catalysts, for example, processes as aforementioned about the catalytic components A and B. There is no especial limitation with regard to the supporting order, either. Specifically, it is permissible that, on the support, there are simultaneously supported the catalytic components A and C, or there is supported the catalytic component C following the catalytic component A, or there is supported the catalytic component A following the catalytic component C. Also in the case of a catalyst containing the catalytic component B besides the catalytic component A, it is permissible that, on the support, there is supported the catalytic component C simultaneously with the catalytic components A and B, or there is supported the catalytic component C following the catalytic components A and B, or there are supported the catalytic components A and B following the catalytic component C. Incidentally, similarly to the catalytic component B, the catalytic component C may be caused to be distributed with a quantitatively great inclination toward surfaces of the catalyst or may be caused to exist quantitatively substantially evenly throughout the whole catalyst without such a quantitatively great inclination.

Other Components and Their Being Contained

The catalyst for purification of exhaust gases, according to the present invention, can be caused to further contain a compound of at least one element selected from the group consisting of B, P, Sb, Pb, Sn, Zn, and In (hereinafter referred to as compound D') and/or a sulfur compound as another component D.

(Compound D')

The addition of the compound D' as another component D to the catalyst according to the present invention enables this catalyst to remove CO from exhaust gases with high efficiency for a long term while keeping the oxidation of $SO_2$ low.

Raw materials for supplying the compound D' are not especially limited, and at least one materials as utilized for production of conventional catalysts are usable. There is no especial limitation with regard to processes for making the compound D' contained, either, and examples thereof include: a process involving making the compound D' contained by supporting it on the support by processes as utilized for production of conventional catalysts; and a process involving making the compound D' contained either by adding and mixing it in preparing the support or by using the compound D' as one of materials of the support. Above all, in the case of making the compound D' contained by the supporting, although there is no especial limitation with regard to the supporting order, either, specifically, it is favorable that, on the support, there are simultaneously supported the catalytic component A and the compound D', or there is supported the compound D' preceding the catalytic component A. Also in the case of a catalyst containing the catalytic component B besides the catalytic component A, it is favorable that, on the support, there is supported the compound D' simultaneously with the catalytic components A and B, or there is supported the compound D' preceding the catalytic components A and B. Incidentally, similarly to the catalytic component B, the compound D' may be caused to be distributed with a quantitatively great inclination toward surfaces of the catalyst or may be caused to exist quantitatively substantially evenly throughout the whole catalyst without such a quantitatively great inclination. In addition, in the case of supporting both the above catalytic component C and the compound D', the supporting order therebetween is not especially limited, and they may simultaneously be supported, or either one may be supported preceding the other.

It is favorable to make the compound D' contained in the range of not more than 10 weight %, more favorably 0.005 to 10 weight %, still more favorably 0.02 to 5 weight %, in terms of atom of the above various elements (B, P, Sb, Pb, Sn, Zn, and In) relative to the entity of the catalyst. In the case where the compound D' content is higher than 10 weight %, there is a possibility that the compound D' may act as a poisonous component to the active component and thereby inversely deteriorate the activity.

As the compound D', for example, phosphorus compounds are favorably usable, and explanations are hereinafter made about their cases in detail. However, compounds of the above various elements (B, Sb, Pb, Sn, Zn, and In) other than P are also usable in the same way as of the phosphorus compounds below.

There is no especial limitation with regard to raw materials for supplying the phosphorus compound, and, for example, there can favorably be used those which are cited as inorganic phosphorus compounds and organic phosphorus compounds, but it is particularly favorable to use water-soluble phosphorus compounds such as phosphoric acid, ammonium phosphate, and ammonium dihydrogenphosphate.

There are many unclear parts still at present with regard to the reason why making the phosphorus compound contained in the range of not more than 10 weight % in terms of phosphorus atom relative to the entity of the catalyst in the above way enables this catalyst to remove CO from exhaust gases with high efficiency for a long term, but this reason can be inferred as follows. That is to say, it can be considered that: if the catalyst is made to contain the phosphorus compound in the specific ratio as in the present invention, then deteriorations in physical properties (e.g. specific surface area, pore structure, crystal structure) of the catalyst itself, which easily occur in the case of long-term exposure of about 300 to about 500° C. high-temperature exhaust gases containing high-concentrated oxygen and water vapor, are inhibited and, as a result, deteriorations in performances of the catalyst can be inhibited. Therefore, a catalyst having the resistance to thermal load is obtained without increasing the quantity of the supported noble metal, and the resultant catalyst can maintain high activity even if exposed for a long term under a flow of the high-temperature exhaust gases containing high-concentrated oxygen and water vapor.

Although there is no especial limitation with regard to methods for making the catalyst contain the phosphorus compound, for example, the catalyst may be made to contain the phosphorus compound by adding the above phosphorus compound in the step of molding the support, or it is also possible to make the catalyst contain the phosphorus compound by using a starting material containing phosphorus when producing the support. In addition, it is also possible to make the catalyst contain the phosphorus compound by immersing the support into an aqueous solution containing the raw materials for supplying the phosphorus compound similarly to means as used for production of conventional catalysts.

There is no especial limitation with regard to the order of making the catalyst contain the phosphorus compound, either, and the catalyst may be made to contain the phosphorus compound either simultaneously with supporting the catalytic components A and/or B or after supporting the catalytic components A and B, so the catalyst can be made to contain the phosphorus compound in various orders, but it is favorable to make the catalyst contain the phosphorus compound before supporting the catalytic components A and/or B.

There is no especial limitation with regard to the form in which the phosphorus compound is contained in the support, and the phosphorus compound may be contained quantitatively substantially evenly in the support, or the contained form may be such that the concentration of the phosphorus compound as contained has a concentration gradient (concentration distribution), for example, the content is high near outer surfaces of the support, but becomes lower toward inside the support. However, above all, it is favorable that the phosphorus compound is contained quantitatively substantially evenly in the support.

(Sulfur Compound):

The catalyst according to the present invention can further comprise a sulfur compound as another component D in the range of not more than 1 weight % in terms of sulfur atom relative to the entity of the catalyst.

If the catalyst according to the present invention further comprises the sulfur compound, this catalyst can suppress the rise of the $SO_2$-oxidizing ratio (which is problematic during the operation) to keep it low and further has sufficient durability to $SO_x$, so it becomes possible for this catalyst to maintain its performances with high efficiency stably for a long term. Furthermore, it also becomes possible for the catalyst to enhance its ability to remove the CO (particularly, low-concentration CO) and the unburned volatile organic compounds (e.g. acetaldehyde) from the exhaust gases.

Because sulfur-containing compounds, such as hydrogen sulfide and mercaptans, usually acts as poisonous components to the catalyst, it has generally been taken for granted that the sulfur component is a cause of deteriorating the catalyst activity. However, as a result of the present inventors' study, it has been found out that, if a specific sulfur compound such as sulfate ion ($SO_4^{2-}$) is made to be contained, then such as the above removability may be enhanced. Thus, the present inventors studied in more detail and, as a result, have found out that, although it cannot sweepingly be said to be enough to make the content large, if the content is controlled to a moderate one, the resultant catalyst is very excellent in such as the above removability.

There are many unclear parts still at present with regard to the reason why making the sulfur compound contained in the range of not more than 1 weight % in terms of sulfur atom relative to the entity of the catalyst in the above way enhances such as the ability to remove the CO (particularly, low-concentration CO) and the unburned volatile organic compounds (e.g. acetaldehyde) from the exhaust gases, but this reason can be inferred as follows. That is to say, a product obtained by making the titanium-containing oxide contain the sulfate ion has so far been known to display strong acidity as not seen in the case of the titanium-containing oxide alone, and is called solid super-strong acid. Being inferred from such a fact, if the sulfur compound is made to be contained in the range of not more than 1 weight % in terms of sulfur atom relative to the entity of the catalyst as in the present invention, then the sulfur compound (sulfate ion) results in coexisting with the titanium-containing oxide, and properties (e.g. acidity) of the titanium-containing oxide (which is the support) are thereby changed, and such a change in properties of the support exerts an influence on such as the supported state and electronic state of the catalytic component as supported on the support, and thereby provides better effects, so that it becomes possible for the catalyst to more efficiently purify the CO (particularly, low-concentration CO) and the unburned volatile organic compounds (e.g. acetaldehyde) in the exhaust gases, and further to maintain its performances stably for a long term.

Examples of the sulfur compound include sulfate ion and sulfite ion. The sulfur compound may be used either alone respectively or in combinations with each other. If the above sulfur compound is contained as a catalytic component, then the CO and the unburned volatile organic compounds (such as aldehydes) in the exhaust gases can more efficiently be purified.

Although there is no especial limitation with regard to methods for making the catalyst contain the sulfur compound, for example, the catalyst may be made to contain the sulfur compound by adding the above sulfur compound in the step of molding the support, or it is also possible to make the catalyst contain the sulfur compound by using a starting material including a sulfate salt when producing the support. In addition, it is also possible to make the catalyst contain the sulfur compound by immersing the support into an aqueous solution containing the raw materials for supplying the sulfur compound similarly to means as used for production of conventional catalysts.

As raw materials for supplying the sulfur compound, for example, there can be used the following: sulfuric acid, sulfurous acid, ammonium sulfate, ammonium sulfite, ammonium hydrogensulfate, and ammonium hydrogensulfite.

Although there is no especial limitation with regard to the order of making the catalyst contain the sulfur compound, either, it is favorable to make the catalyst contain the sulfur compound before supporting the catalytic components A and/or B.

Although there is no especial limitation with regard to the form in which the sulfur compound is contained in the support, the sulfur compound may be contained quantitatively substantially evenly in the support, or the contained form may be such that the contained concentration has a concentration gradient, for example, the content is high near outer surfaces of the support, but becomes lower toward inside the support.

The sulfur compound content is, as aforementioned, favorably in the range of not more than 1 weight %, but more favorably 0.01 to 1 weight %, still more favorably 0.05 to 0.75 weight %, particularly favorably 0.1 to 0.5 weight %, in terms of sulfur atom relative to the entity of the catalyst. In the case where the sulfur compound content is higher than 1 weight %, there are disadvantages in that the sulfur compound acts as a poisonous component to the active component and thereby inversely deteriorates the activity.

Preparation of Catalyst and its Properties

The catalyst for purification of exhaust gases, according to the present invention, is obtained by a process including the steps of: supporting the catalytic component (from the above various supplying raw materials) in a predetermined supporting quantity on the porous honeycomb support including the titanium-containing oxide, and then subjecting the resultant product to drying and calcining treatments. The drying can usually be carried out by treatment under air atmosphere, nitrogen atmosphere, or flows of these gases in the temperature range of 50 to 200° C. for 1 to 24 hours.

The calcination can be carried out by heat-treatment in the temperature range of 200 to 900° C. for 1 to 10 hours. The calcination is usually carried out under air atmosphere or air flow, but it is also possible to replace air with nitrogen or gases including reducible gases such as hydrogen.

The catalyst, comprising the support and the catalytic component supported thereon, is of the porous structure having fine pores. The quantity of the pores has influence on diffusion of gases inside the catalyst. In addition, the specific surface area of the catalyst also has influence on the exhaust gas purifiability.

Usually, it is proper that the total pore volume is in the range of 0.2 to 0.8 cm$^3$/g (mercury penetration method). In the case where the pore volume is too small, the catalytic activity may be low. In the case where the pore volume is too large, the mechanical strength of the catalyst may be low.

The specific surface area of the catalyst also has influence on performance. Usually adopted is a catalyst having a specific surface area in the range of 30 to 250 m$^2$/g, favorably 40 to 200 m$^2$/g (BET method). In the case where the specific surface area is too small, the catalytic activity may be insufficient. In the case where the specific surface area is too large, there may occur unfavorable effects such that: the catalytic activity is not so much enhanced, whereas the accumulation of catalytically poisonous components increases, or the life time of the catalyst becomes short.

Mode for Using the Catalyst

The catalyst for purification of exhaust gases, according to the present invention, is a honeycomb-shaped catalytic structure, and is a monolithically molded structure of such a catalyst composition alone as obtained by a process including the steps of: molding such as a powder of the titanium-containing oxide into a desired shape with such as extrusion molding machines; and then calcining the resultant molded product; and then supporting the catalytic component on the resultant calcined product.

The catalyst is usually used in a state placed in a catalytic reactor made of such as metal. The catalytic reactor is provided with an exhaust-gas-introducing inlet and an exhaust-gas-discharging outlet, and with a structure such that the exhaust gases can efficiently come into contact with the catalyst as placed inside.

(Process for Purification of Exhaust Gases):

The process for purification of exhaust gases, according to the present invention, is a process for purification of exhaust gases to remove CO therefrom, and is characterized by comprising the step of bringing the exhaust gases into contact with the catalyst for purification of exhaust gases according to the present invention.

Basically applied to the case of carrying out the process for purification of exhaust gases according to the present invention are arts for purification of exhaust gases with conventional metal-oxide-supported noble metal catalysts. Usually, the catalytic reactor in which the catalyst is placed is set along the discharging way of such as exhaust gases. The exhaust gases undergo predetermined catalysis by coming into contact with surfaces of the catalyst when passing through the catalytic reactor.

The process for purification of exhaust gases, according to the present invention, can simultaneously purify not only the CO but also the unburned volatile organic compounds that are contained in the exhaust gases.

In the case of purifying the exhaust gases with the catalyst for purification of exhaust gases according to the present invention, the efficiency of the purification of exhaust gases with the catalyst is enhanced by properly setting conditions such as temperature and space velocity of the exhaust gases. For example, it is favorable to purify the combustion exhaust gases of 250 to 600° C. in gas temperature and 30,000 to 1,000,000 H$^{-1}$ in space velocity. More favorably, a gas temperature of 300 to 550° C. can be adopted, and a space velocity of 50,000 to 500,000 H$^{-1}$ can be adopted. Furthermore favorable are purification conditions of Linear Velocity (LV)=not less than 0.1 m/s (Normal) or dust concentration=not more than 10 mg/m$^3$ (Normal).

In the process for purification of exhaust gases according to the present invention, before and/or after the step for purification of exhaust gases with the catalyst for purification of exhaust gases according to the present invention, another step for purification of exhaust gases with another kind of catalyst for purification of exhaust gases may be combined. Favorable as this other step is a step which can efficiently purify components difficult to purify with the catalyst for purification of exhaust gases according to the present invention.

For example, in the case of purifying the exhaust gases containing the nitrogen oxides (NO$_x$) besides such as CO, this purification can be carried out by combining a step for purification of exhaust gases with a DeNO$_x$ catalyst and the step for purification of exhaust gases with the catalyst for purification of exhaust gases according to the present invention. If the purification is carried out in this way, in the case where the exhaust gases containing the CO and the nitrogen oxides (NO$_x$) are purified, then the nitrogen oxides (NO$_x$) can also efficiently be removed along with the CO. In addition, when the above exhaust gases containing the CO and the nitrogen oxides (NO$_x$) are purified, this purification is favorably carried out under an atmosphere excessively containing molecular oxygen.

Incidentally, in the above step for purification of exhaust gases with a DeNO$_x$ catalyst, the exhaust gases are brought into contact with a DeNO$_x$ catalyst in the presence of a reducing agent. Examples of the reducing agent include ammonia, urea, and hydrazine. These may be used either alone respectively or in combinations with each other. Although the quantity of the reducing agent as used may be set fittingly for the demanded nitrogen oxides (NO$_x$) removal ratio and is not especially limited, specifically, the molar ratio of the reducing agent to the nitrogen oxides (NO$_x$) in the exhaust gases (reducing agent/NO$_x$) is favorably less than 2, more favorably less than 1.5, still more favorably less than 1.2. In the case where the above molar ratio is not less than 2, there are disadvantages in that a large quantity of reducing agent will remain in gases after the nitrogen oxides (NO$_x$) removal step.

As examples of the above case where there are combined the step for purification of exhaust gases with the catalyst for purification of exhaust gases according to the present invention and the step for purification of exhaust gases with a DeNO$_x$ catalyst in the presence of a reducing agent on the occasion when the exhaust gases containing the CO and the NO$_x$ are purified, there can be cited: 1) a process comprising the steps of: bringing the exhaust gases into contact with the catalyst for purification of exhaust gases according to the present invention, thereby removing the CO from the exhaust gases; and then bringing the exhaust gases into contact with a DeNO$_x$ catalyst in the presence of a reducing agent, thereby removing the NO$_x$ from the exhaust gases; and 2) a process comprising the steps of: bringing the exhaust gases into contact with a DeNO$_x$ catalyst in the presence of a reducing agent, thereby removing the NO$_x$ from the exhaust gases; and then bringing the exhaust gases into contact with the catalyst for purification of exhaust gases according to the present invention, thereby removing the CO from the exhaust gases.

The former process 1) has the advantage of being able to more inhibit the activity of the catalyst for purification of exhaust gases according to the present invention from being deteriorated by SO$_x$. Specifically, the oxidation reaction of SO$_2$→SO$_3$ usually occurs also in the purification with a DeNO$_x$ catalyst. The deterioration by SO$_3$ in the activity of the catalyst for purification of exhaust gases according to the present invention is even more than by SO$_2$. If the catalyst for purification of exhaust gases according to the present invention is put upstream of the DeNO$_x$ catalyst, then it is expected that the above deterioration in the activity can be inhibited.

The latter process 2) has the advantage of being able to more decrease a surplus of the reducing agent (e.g. NH$_3$). Specifically, usually, the reducing agent (e.g. NH$_3$), as used for the purification with a DeNO$_x$ catalyst, gets concerned in the removal reaction of such as NO$_x$ and thereby decreases in quantity, but, depending on purification conditions, results in remaining unreacted to mingle into exhaust gases after the purification and is therefore problematic. However, the catalyst for purification of exhaust gases according to the present invention further has the ability to oxidize the reducing agent (e.g. NH$_3$). Thus, if the catalyst for purification of exhaust gases according to the present invention is put downstream of the above DeNO$_x$ catalyst, it is expected that the catalyst for purification of exhaust gases according to the present invention can oxidize the unreacted reducing agent to more decrease it. In addition, particularly, in the case where a high NO$_x$-removal ratio is demanded such as case where a strict emission regulation value is imposed, the use of this process 2) is very effective in that: the reducing agent (e.g. NH$_3$) can be excessively supplied to make the NO$_x$-removal efficiency with the DeNO$_x$ catalyst in the prior step as high as possible, and further a large quantity of reducing agent remaining unreacted can be removed with the catalyst for purification of exhaust gases according to the present invention in the posterior step.

Applicable to the above technique for purification of exhaust gases with the DeNO$_x$ catalyst is a technique as previously applied for a patent by the present applicant in Japan and disclosed in JP-A-235206/1998. The DeNO$_x$ catalyst as used in this technique comprises a combination of a catalytic component a (titanium oxide) and a catalytic component b (oxide of metal including vanadium or tungsten) and has a structure such that the catalytic component b is supported on the catalytic component a.

The process for purification of exhaust gases, according to the present invention, can be intended also for the exhaust gases containing the nitrogen oxides (NO$_x$) besides such as CO, as exhaust gases being purified, and can efficiently remove the CO even from such exhaust gases.

The process for purification of exhaust gases according to the present invention, which involves the use of the above catalyst for purification of exhaust gases according to the present invention, can also remove the NO$_x$ simultaneously with such as CO. In this case, favorably for enhancing the efficiency of the removal of the NO$_x$, this removal is carried out in the presence of the reducing agent such as ammonia, urea, and hydrazine. Furthermore, in these cases, for example, it is favorable to purify exhaust gases of 250 to 500° C. in gas temperature and 2,000 to 500,000 H$^{-1}$ in space velocity.

The process for purification of exhaust gases according to the present invention may be combined with publicly known processes for purification of exhaust gases as disclosed in such as JP-A-146991/1978, JP-A-065721/1987, and JP-B-004126/1994.

In the present invention, very high catalytic activity is obtained, and further, high purification efficiency can be achieved without increasing the quantity of the supported noble metal as a catalytic component, because used as the catalyst for purification of the CO as contained in the exhaust gases is the honeycomb-shaped catalyst comprising: a monolithically molded type porous honeycomb structure including a titanium-containing oxide as a support; and a catalytic component A including at least one noble metal element, wherein the catalytic component A is supported on the support in the form distributed with a quantitatively great inclination toward surfaces of the catalyst. As a result, the process for purification of exhaust gases according to the present invention becomes a very effective process as a process for purification of CO-containing exhaust gases having a great space velocity as discharged from such as gas turbines.

(Effects and Advantages of the Invention)

The present invention can more enhance the efficiency of the purification of the CO-containing exhaust gases with the aforementioned catalyst for purification of exhaust gases comprising the metal-oxide-supported noble metal, particularly, can enable achievement of high purification efficiency without increasing the quantity of the supported noble metal as a catalytic component.

DETAILED DESCRIPTION OF THE PREFERRED EMBODIMENTS

Hereinafter, the present invention is more specifically illustrated by the following examples of some preferred embodiments in comparison with comparative examples not according to the invention. However the present invention is not limited to these examples. Incidentally, hereinafter, for convenience, the unit "weight part(s)" may be referred to simply as "part(s)". In addition, the unit "weight %" may be referred to simply as "wt %".

The following are conditions for compositional analysis and EPMA sectional linear analysis of catalysts produced in the below-mentioned Examples and Comparative Examples.

<Compositional Analysis of Catalysts>:

The compositional analysis of the catalysts was carried out by fluorescent X-ray analysis under the following conditions:

Analyzer: product name: RIX2000, produced by Rigaku Corporation
Atmosphere around samples during the analysis: vacuum
Spin rate of samples: 60 rpm
X-ray source: Rh tubular globe <EPMA Sectional Linear Analysis>:

Analyzer: product name: EPMA-1610, produced by Shimadzu Corporation
X-ray beam diameter: 1 µm
Acceleration voltage: 15 kV
Sample current: 0.1 µA
Measurement interval: 1 µm
Measurement time: 1 second/point —Catalysts for purification of exhaust gases—

EXAMPLE 1-1

Preparation of Ti—Si-Composite Oxide

An amount of 100 kg of titanium tetrachloride was gradually added dropwise to 700 liters of water under cooled and stirred conditions. Next, 40 kg of colloidal silica with an $SiO_2$ content of 20 weight % (Snowtex-20 (trade name), produced by Nissan Chemical Industries, Ltd.) was added thereto. After the end of the addition, the temperature was kept at about 30° C., and then ammonia water was gradually added dropwise thereinto under cooled and well-stirred conditions until the pH value became 7.5. The resultant gel was aged for 2 hours as it was. Thereafter, the aged gel was filtered off, and then washed with water, and then dried at 150° C. for 10 hours. The resultant product was calcined at 500° C., and then ground with a hammer mill to obtain a powder. In an X-ray diffraction chart of this powder, neither clear characteristic peak of $TiO_2$ nor $SiO_2$ was seen, but a broad diffraction peak was seen, from which it was verified that the resultant powder was a titanium-silicon-composite oxide (Ti—Si-composite oxide) having an amorphous fine structure.

Production of Honeycomb Support

To 20 kg of the above Ti—Si-composite oxide, there were added 1 kg of phenol resin (Bellpearl (trade name), produced by Kanebo Co.) and 0.5 kg of starch (as a molding assistant) to mix them together. The resulting mixture was well kneaded with a kneader while a proper quantity of water was added thereto. The kneaded product was molded into a honeycomb form having an external form size of 80 mm square, an opening size of 2.1 mm, a wall thickness of 0.4 mm and a length of 500 mm with an extrusion molding machine. Thereafter, the resultant form was dried at 80° C. and then calcined at 450° C. for 5 hours under air atmosphere to obtain the honeycomb support.

Figure 2:
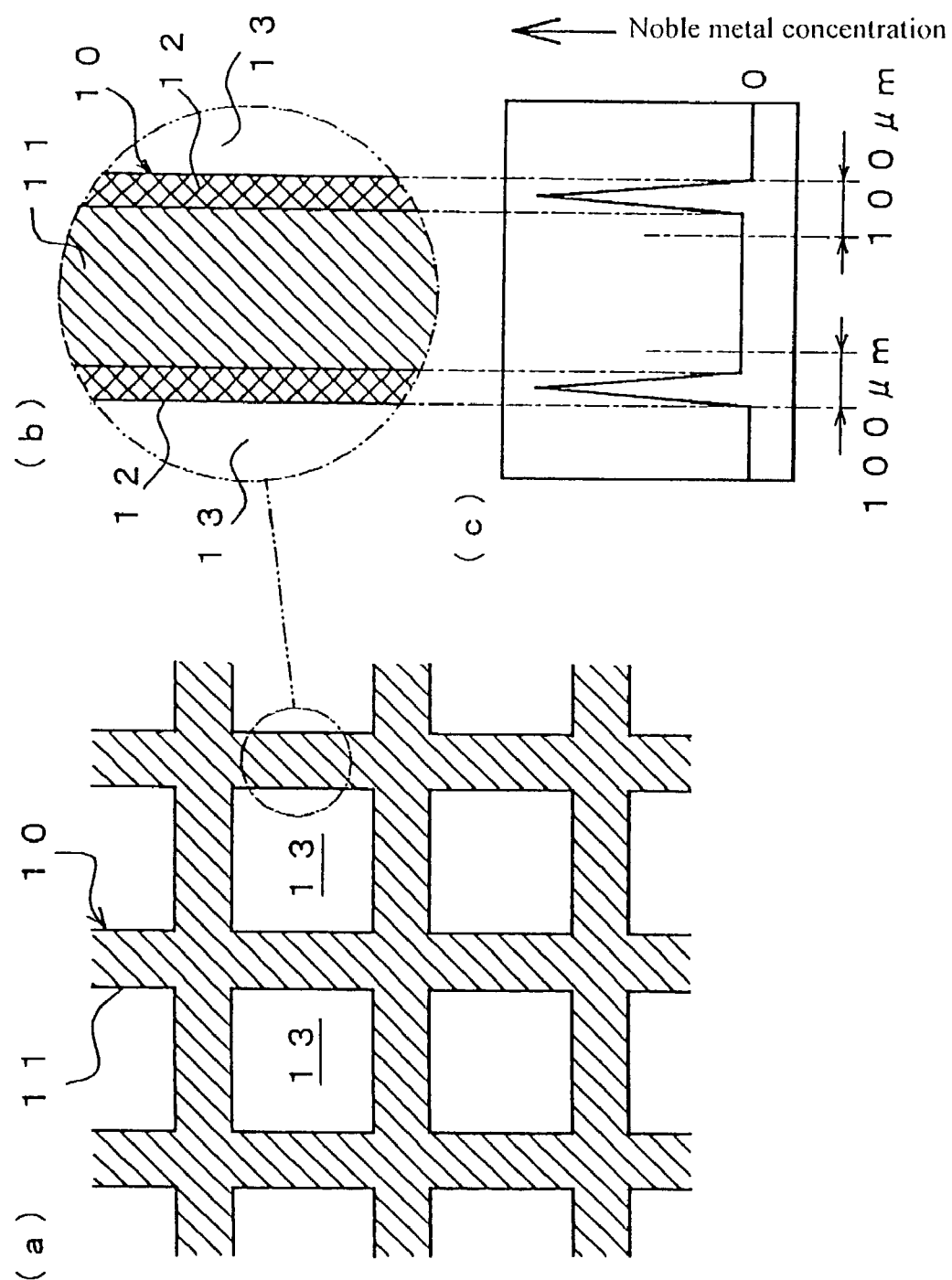
FIG. 2 is (a) a section, (b) an enlarged section, and (c) a graph of noble metal concentration of a catalyst for purification of exhaust gases showing a mode for carrying out the present invention.

The resultant honeycomb support has a latticed structure, as shown in FIG. 2(a), such that the opening size of each exhaust gas passageway is 2.1 mm, and that the wall thickness of the lattice wall is 0.4 mm.

Production of Catalyst by Supporting Catalytic Component:

The above honeycomb support was impregnated with a boiled dinitrodiammineplatinum solution and thereby caused to chemically adsorb Pt, and then dried. Next, the resultant product was calcined at 450° C. for 2 hours under air atmosphere to obtain a catalyst A comprising the honeycomb support as the support and Pt as noble metal particles supported thereon.

Analysis of Catalyst:

The composition of the resultant catalyst A was analyzed. As a result, it was (Ti—Si-composite oxide):Pt=99.9:0.1 (weight ratio).

Figure 3:
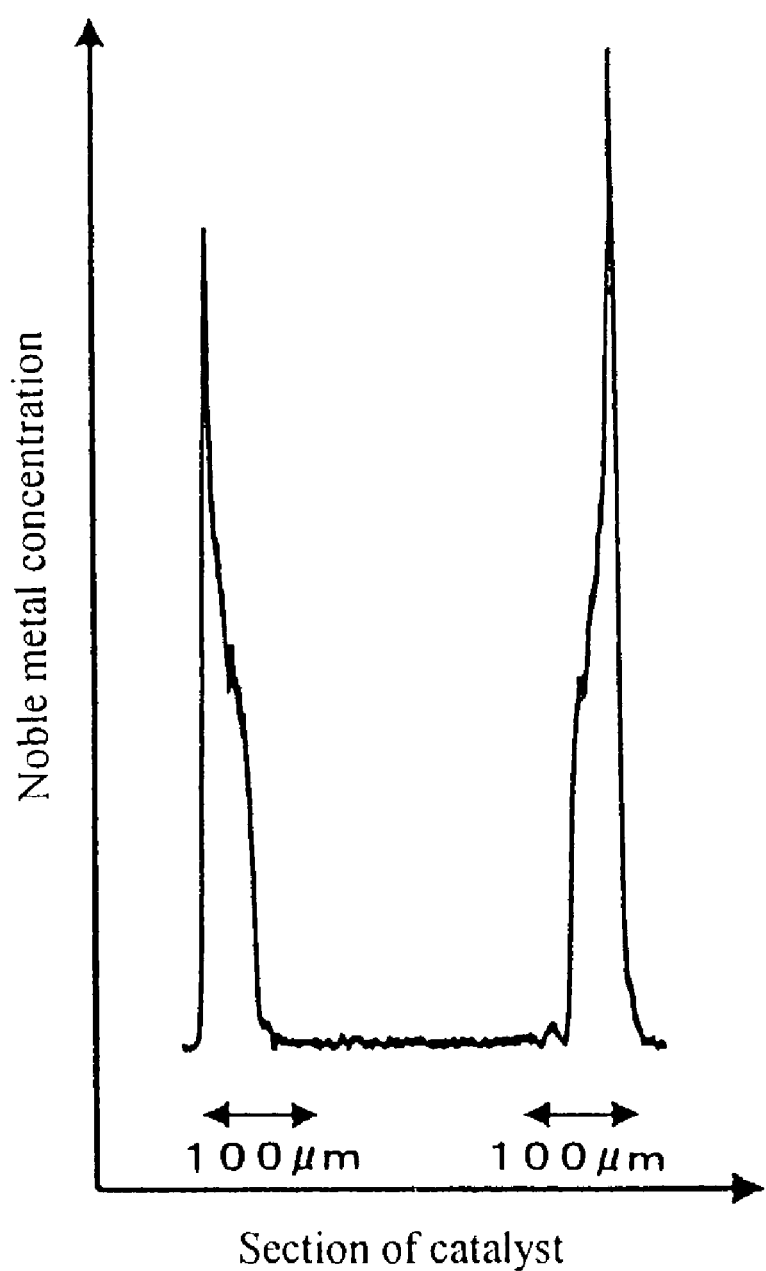
FIG. 3 is a graph of EPMA sectional linear analysis in Example 1-1.

The catalyst A was analyzed by EPMA sectional linear analysis into Pt. Its result is shown in FIG. 3. From this result, it was verified that not less than 90 weight % of the total quantity of the supported Pt was distributed in the range of from surfaces to a depth of 100 µm in the catalyst A. The average particle diameter of Pt, as measured with a transmission electron microscope, was smaller than 5 nm.

EXAMPLE 1-2

A catalyst B was obtained by the same process as of Example 1-1 except that the dinitrodiammineplatinum solution was replaced with a hexaammineplatinum hydroxide solution.

The composition of the catalyst B was (Ti—Si-composite oxide):Pt=99.9:0.1 (weight ratio). From the result of EPMA sectional linear analysis into Pt, it was verified that not less than 90 weight % of the total quantity of the supported Pt was distributed in the range of from surfaces to a depth of 100 µm. From the result of measurement with a transmission electron microscope, the average particle diameter of Pt was smaller than 5 nm.

EXAMPLE 1-3

A catalyst C was obtained by the same process as of Example 1-1 except that a titanium oxide honeycomb support was obtained by changing the metal oxide from the Ti—Si-composite oxide to a commercially available titanium oxide powder (DT-51 (trade name), produced by Millennium Inorganic Chemicals Limited).

The composition of the catalyst C was $TiO_2$:Pt=99.9:0.1 (weight ratio). From the result of EPMA sectional linear analysis into Pt, it was verified that not less than 90 weight % of the total quantity of the supported Pt was distributed in the range of from surfaces to a depth of 100 µm. From the result of measurement with a transmission electron microscope, the average particle diameter of Pt was smaller than 5 nm.

EXAMPLE 1-4

Preparation of Titanium Oxide

An amount of 100 kg of titanium tetrachloride was gradually added dropwise to 700 liters of water under cooled and stirred conditions. After the end of the dropwise addition, the temperature was kept at about 30° C., and then ammonia water was gradually added dropwise thereinto under cooled and well-stirred conditions until the pH value became 7.5. The resultant gel was aged by leaving it as it was for 2 hours. Thereafter, the aged gel was filtered off, and then washed with water, and then dried at 150° C. for 10 hours. The resultant product was calcined at 500° C., and then ground with a hammer mill to obtain a titanium oxide powder.

Production of Honeycomb Support

To 20 kg of the above titanium oxide powder, there were added 1 kg of phenol resin (Bellpearl (trade name), produced by Kanebo Co.) and 0.5 kg of starch (as a molding assistant) to mix them together. The resulting mixture was well kneaded with a kneader while a proper quantity of water was added thereto. The kneaded product was molded into a honeycomb form having an external form size of 80 mm square, an opening size of 2.1 mm, a wall thickness (wall thickness of lattice wall) of 0.4 mm and a length of 500 mm with an extrusion molding machine. Thereafter, the resultant form was dried at 80° C. and then calcined at 450° C. for 5 hours under air atmosphere to obtain the honeycomb support of the titanium oxide.

Production of Catalyst by Supporting Catalytic Component

The above honeycomb support was impregnated with a boiled dinitrodiammineplatinum solution and thereby caused to chemically adsorb Pt, and then dried. Next, the resultant product was calcined at 450° C. for 2 hours under air atmosphere to obtain a catalyst D comprising the honeycomb support as the support and Pt as noble metal particles supported thereon.

Analysis of Catalyst

The composition of the resultant catalyst D was analyzed. As a result, it was $TiO_2$:Pt=99.9:0.1 (weight ratio).

The catalyst D was analyzed by EPMA sectional linear analysis into Pt. From its result, it was verified that not less than 90 weight % of the total quantity of the supported Pt was distributed in the range of from surfaces to a depth of 100 μm in the catalyst D.

The average particle diameter of Pt, as measured with a transmission electron microscope, was smaller than 5 nm.

EXAMPLE 1-5

A catalyst E was obtained by the same process as of Example 1-4 except that the honeycomb support was impregnated with the dinitrodiammineplatinum solution at room temperature.

The composition of the catalyst E was $TiO_2$:Pt=99.9:0.1 (weight ratio). From the result of EPMA sectional linear analysis into Pt, it was verified that 80 weight % of the total quantity of the supported Pt was distributed in the range of from surfaces to a depth of 100 μm.

The average particle diameter of Pt, as measured with a transmission electron microscope, was smaller than 5 nm.

Comparative Example 1-1

A catalyst F was obtained by the same process as of Example 1-4 except that the honeycomb support was impregnated with a hydrogen hexachloroplatinate solution at room temperature.

The composition of the catalyst F was $TiO_2$:Pt=99.9:0.1 (weight ratio). From the result of EPMA sectional linear analysis into Pt, it was verified that only less than 70 weight % of the total quantity of the supported Pt was distributed in the range of from surfaces to a depth of 100 μm in the catalyst F The average particle diameter of Pt, as measured with a transmission electron microscope, was smaller than 5 nm.

EXAMPLE 1-6

A catalyst G was obtained by supporting Pt on the honeycomb support by the same process as of Example 1-1 except that the honeycomb support was impregnated with the dinitrodiammineplatinum solution at room temperature.

The composition of the catalyst G was (Ti—Si-composite oxide):Pt=99.9:0.1 (weight ratio). From the result of EPMA sectional linear analysis into Pt, it was verified that 80 weight % of the total quantity of the supported Pt was distributed in the range of from surfaces to a depth of 100 μm.

The average particle diameter of Pt, as measured with a transmission electron microscope, was smaller than 5 nm.

Comparative Example 1-2

A catalyst H was obtained by supporting Pt on the honeycomb support by the same process as of Example 1-4 except that the titanium oxide powder was replaced with an $Al_2O_3$ powder, and that the honeycomb support was impregnated with a hydrogen hexachloroplatinate solution at room temperature.

The composition of the catalyst H was $Al_2O_3$:Pt=99.9:0.1 (weight ratio). From the result of EPMA sectional linear analysis into Pt, it was verified that only less than 70 weight % of the total quantity of the supported Pt was distributed in the range of from surfaces to a depth of 100 μm in the catalyst H The average particle diameter of Pt, as measured with a transmission electron microscope, was smaller than 5 nm.

EXAMPLE 1-7

A catalyst I was obtained by supporting Pt and Pd on the honeycomb support by the same process as of Example 1-1 except that the dinitrodiammineplatinum solution was replaced with a mixed solution of hexaammineplatinum hydroxide and tetraamminepalladium hydroxide.

The composition of the catalyst I was (Ti—Si-composite oxide):Pt:Pd=99.9:0.05:0.05 (weight ratio). From the result of EPMA sectional linear analysis into Pt and Pd, it was verified that, as to both Pt and Pd, not less than 90 weight % of the total supporting quantity was distributed in the range of from surfaces to a depth of 100 μm.

EXAMPLE 1-8

The honeycomb support of the Ti—Si-composite oxide, as prepared in Example 1-1, was impregnated with a tungstic acid solution, and then dried. Next, the resultant product was calcined at 450° C. for 2 hours under air atmosphere. Furthermore, the resultant honeycomb support on which tungsten was supported was impregnated with a boiled hexaammineplatinum hydroxide solution, and then dried. Next, the resultant product was calcined at 450° C. for 2 hours under air atmosphere to support Pt and W on the honeycomb support, thus obtaining a catalyst J.

The composition of the catalyst J was (Ti—Si-composite oxide):W:Pt=97.4:2.5:0.1 (weight ratio). From the result of EPMA sectional linear analysis into Pt, it was verified that not less than 90 weight % of the total quantity of the supported Pt was distributed in the range of from surfaces to a depth of 100 μm.

EXAMPLE 2-1

A catalyst K was obtained by the same process as of Example 1-1 except that the dinitrodiammineplatinum solution was replaced with a mixed solution of hexaammineplatinum hydroxide and magnesium acetate.

The composition of the catalyst K was (Ti—Si-composite oxide):Mg:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm in the catalyst K. The average particle diameter of Pt, as measured with a transmission electron microscope, was smaller than 5 nm.

EXAMPLE 2-2

The honeycomb support of the Ti—Si-composite oxide, as prepared in Example 1-1, was impregnated with a cerium nitrate solution, and then dried. Next, the resultant product was calcined at 450° C. for 2 hours under air atmosphere. Furthermore, the resultant honeycomb support on which cerium was supported was impregnated with a boiled ruthenium nitrate solution, and then dried. Next, the resultant product was calcined at 450° C. for 2 hours under air atmosphere to support Ru and Ce on the honeycomb support, thus obtaining a catalyst L.

The composition of the catalyst L was (Ti—Si-composite oxide):Ce:Ru=94.7:5:0.3 (weight ratio). From the result of EPMA sectional linear analysis into Ru, it was verified that not less than 90 weight % of the total quantity of the supported Ru was distributed in the range of from surfaces to a depth of 100 μm.

EXAMPLE 2-3

A catalyst M was obtained by the same process as of Example 2-1 except that the mixed solution of hexaammineplatinum hydroxide and magnesium acetate was replaced with a mixed solution of hexaammineplatinum hydroxide and calcium acetate.

The composition of the catalyst M was (Ti—Si-composite oxide):Ca:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 2-4

A catalyst N was obtained by the same process as of Example 2-1 except that the mixed solution of hexaammineplatinum hydroxide and magnesium acetate was replaced with a mixed solution of hexaammineplatinum hydroxide and sodium acetate.

The composition of the catalyst N was (Ti—Si-composite oxide):Na:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 2-5

A catalyst O was obtained by the same process as of Example 2-1 except that the mixed solution of hexaammineplatinum hydroxide and magnesium acetate was replaced with a mixed solution of hexaammineplatinum hydroxide and lithium acetate.

The composition of the catalyst O was (Ti—Si-composite oxide):Li:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 2-6

A catalyst P was obtained by the same process as of Example 2-1 except that the mixed solution of hexaammineplatinum hydroxide and magnesium acetate was replaced with a mixed solution of hexaammineplatinum hydroxide and yttrium acetate.

The composition of the catalyst P was (Ti—Si-composite oxide):Y:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 2-7

A catalyst Q was obtained by the same process as of Example 2-1 except that the mixed solution of hexaammineplatinum hydroxide and magnesium acetate was replaced with a mixed solution of hexaammineplatinum hydroxide and lanthanum acetate.

The composition of the catalyst Q was (Ti—Si-composite oxide):La:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 2-8

The honeycomb support of the Ti—Si-composite oxide, as used in Example 1-1, was impregnated with a mixed solution of hexaammineplatinum hydroxide and cerium acetate, and then dried. Next, the resultant product was calcined at 450° C. for 2 hours under nitrogen atmosphere to obtain a catalyst R.

The composition of the catalyst R was (Ti—Si-composite oxide):Ce:Pt=98.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-1

Production of Honeycomb Support

To 20 kg of the Ti—Si-composite oxide as prepared in Example 1-1, there were added 1,210 g of a 80 weight % aqueous orthophosphoric acid solution and 1 kg of phenol resin (Bellpearl (trade name), produced by Kanebo Co.) and 0.5 kg of starch (as a molding assistant) to mix them together. The resulting mixture was kneaded with a kneader. The kneaded product was molded into a honeycomb form having an external form size of 80 mm square, an opening size of 2.1 mm, a wall thickness of 0.4 mm and a length of 500 mm with an extrusion molding machine. Thereafter, the resultant form was dried at 80° C. and then calcined at 450° C. for 5 hours under air atmosphere to obtain the honeycomb support.

Production of Catalyst by Supporting Catalytic Component

This honeycomb support was impregnated with a boiled dinitrodiammineplatinum solution and thereby caused to chemically adsorb Pt, and then dried. Next, the resultant product was calcined at 450° C. for 2 hours under air atmosphere to obtain a catalyst S.

Analysis of Catalyst

The composition of the catalyst S was (Ti—Si-composite oxide):P:Pt=98.4:1.5:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-2

A catalyst T was obtained by the same process as of Example 3-1 except that the quantity of the 80 weight % aqueous orthophosphoric acid solution as used was changed from 1,210 g to 1,220 g, and that the dinitrodiammineplatinum solution was replaced with a mixed aqueous solution of hexaammineplatinum hydroxide and magnesium acetate.

The composition of the catalyst T was (Ti—Si-composite oxide):P:Mg:Pt=97.4:1.5:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-3

A honeycomb support was produced by the same process as of Example 3-1 except that the 1,210 g of the 80 weight % aqueous orthophosphoric acid solution was changed to 1,880 g of a 90 weight % aqueous orthophosphoric acid solution.

This honeycomb support was impregnated with a mixed aqueous solution of hexaammineplatinum hydroxide and magnesium acetate in the same way as of Example 3-2, and then dried and calcined in the same way as of Example 3-1, thus obtaining a catalyst U.

The composition of the catalyst U was (Ti—Si-composite oxide):P:Mg:Pt=96.35:2.55:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-4

A honeycomb support was produced by the same process as of Example 3-1 except that the 1,210 g of the 80 weight % aqueous orthophosphoric acid solution was changed to 5,570 g of a 90 weight % aqueous orthophosphoric acid solution.

This honeycomb support was impregnated with a mixed aqueous solution of hexaammineplatinum hydroxide and magnesium acetate in the same way as of Example 3-2, and then dried and calcined in the same way as of Example 3-1, thus obtaining a catalyst V.

The composition of the catalyst V was (Ti—Si-composite oxide):P:Mg:Pt=91.65:7.25:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-5

A honeycomb support was produced by the same process as of Example 3-1 except that the 1,210 g of the 80 weight % aqueous orthophosphoric acid solution was not added.

This honeycomb support was impregnated with a mixed aqueous solution of a dinitrodiammineplatinum solution and calcium acetate and orthophosphoric acid, and then dried and calcined in the same way as of Example 3-1, thus obtaining a catalyst W.

The composition of the catalyst W was (Ti—Si-composite oxide):P:Ca:Pt=98.85:0.05:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-6

A catalyst X was obtained by the same process as of Example 3-1 except that the 20 kg of the Ti—Si-composite oxide was replaced with 20 kg of a commercially available titanium oxide ("DT-51" (trade name), produced by Millennium Inorganic Chemicals Limited).

The composition of the catalyst X was $TiO_2$:P:Pt=98.4:1.5:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-7

To 20 kg of a commercially available titanium-tungsten oxide (Ti—W oxide, "DT-52" (trade name), produced by Millennium Inorganic Chemicals Limited, $TiO_2$:$WO_3$=9:1 (weight ratio)), there was added 1 kg of phenol resin (Bellpearl (trade name), produced by Kanebo Co.) and 0.5 kg of starch (as a molding assistant) to mix them together. The resulting mixture was kneaded with a kneader. The kneaded product was molded into a honeycomb form having an external form size of 80 mm square, an opening size of 2.1 mm, a wall thickness of 0.4 mm and a length of 500 mm with an extrusion molding machine. Thereafter, the resultant form was dried at 80° C. and then calcined at 450° C. for 5 hours under air atmosphere to obtain the honeycomb support.

This honeycomb support was impregnated with an aqueous ammonium dihydrogenphosphate solution, and then dried at 130° C. for 2 hours, and then calcined at 450° C. for 2 hours under air atmosphere, and subsequently further impregnated with a mixed aqueous solution of hexaammineplatinum hydroxide and yttrium acetate, and then dried at 130° C. for 2 hours, and then calcined at 450° C. for 2 hours under air atmosphere, thus obtaining a catalyst Y.

The composition of the catalyst Y was (Ti—W oxide):P: Y:Pt=98.15:0.75:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-8

This honeycomb support, as produced in Example 3-4, was impregnated with an aqueous orthophosphoric acid solution, and then dried at 130° C. for 2 hours, and then calcined at 450° C. for 2 hours under air atmosphere, and subsequently further impregnated with a mixed aqueous solution of liexaammineplatinum hydroxide and magnesium acetate in the same way as of Example 3-2, and then dried and calcined in the same way as of Example 3-1, thus obtaining a catalyst Z.

The composition of the catalyst Z was (Ti—Si-composite oxide):P:Mg:Pt=86.9:12.0:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-9

Preparation of Ti—Si-Composite Oxide

An amount of 35.5 kg of Snowtex-20 (silica sol with an $SiO_2$ content of about 20 weight %, produced by Nissan Chemical Industries, Ltd.) was added to 390 liters of 15 weight % ammonia water, and then they were mixed together by stirring. Thereafter, 540 liters of a sulfuric acid solution of titanyl sulfate (70 g/liter as $TiO_2$, and sulfuric acid concentration=310 g/liter) was gradually added dropwise under agitation. The resultant gel was left alone for 3 hours, and then filtered off to recover the resultant product. Next, the filtered-off and recovered product was dispersed into water of 25° C. and then stirred for 15 minutes, thus washing this product with water. This washing step was repeated three times. Thereafter, the product was recovered by filtration, and then dried at 150° C. for 10 hours. The resultant product was calcined at 500° C. for 3 hours, and then ground with a hammer mill to obtain a powder. In an X-ray diffraction chart of the resultant powder, neither clear characteristic peak of $TiO_2$ nor $SiO_2$ was seen, but a broad diffraction peak was seen, from which it was verified that the resultant powder was a titanium-silicon-composite oxide (Ti—Si-composite oxide) having an amorphous fine structure.

Production of Honeycomb Support

To 20 kg of the above Ti—Si-composite oxide, there were added 1 kg of phenol resin (Bellpearl (trade name), produced by Kanebo Co.) and 0.5 kg of starch (as a molding assistant) to mix them together. The resulting mixture was kneaded with a kneader. The kneaded product was molded into a honeycomb form having an external form size of 80 mm square, an opening size of 2.1 mm, a wall thickness of 0.4 mm and a length of 500 mm with an extrusion molding machine. Thereafter, the resultant form was dried at 80° C. and then calcined at 450° C. for 5 hours under air atmosphere to obtain the honeycomb support.

Production of Catalyst by Supporting Catalytic Component

This honeycomb support was impregnated with a boiled dinitrodiammineplatinum solution, and then dried. Next, the resultant product was calcined at 450° C. for 2 hours under air atmosphere to obtain a catalyst a.

Analysis of Catalyst

The composition of the resultant catalyst a was (Ti—Si-composite oxide):S:Pt=99.4:0.5:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-10

To 20 kg of the titanium oxide powder as prepared in Example 1-4, there were added 2 kg of a 25 weight % aqueous ammonium sulfate solution, 1 kg of phenol resin (Bellpearl (trade name), produced by Kanebo Co.) and 0.5 kg of starch (as a molding assistant) to mix them together. The resulting mixture was kneaded with a kneader. The kneaded product was molded into a honeycomb form having an external form size of 80 mm square, an opening size of 2.1 mm, a wall thickness of 0.4 mm and a length of 500 mm with an extrusion molding machine. Thereafter, the resultant form was dried at 80° C. and then calcined at 450° C. for 5 hours under air atmosphere to obtain the honeycomb support.

This honeycomb support was impregnated with a boiled dinitrodiammineplatinum solution, and then dried, and then calcined at 450° C. for 2 hours under air atmosphere to obtain a catalyst b.

The composition of the catalyst b was $TiO_2$:S:Pt=99.3: 0.6:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-11

A catalyst c was obtained by the same process as of Example 3-9 except that the dinitrodiammineplatinum solution was replaced with a mixed solution of hexaammineplatinum hydroxide and magnesium acetate.

The composition of the catalyst c was (Ti—Si-composite oxide):S:Mg:Pt=98.4:0.5:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-12

The gel, as obtained in the same way as of Example 3-9, was left alone for 3 hours, and then filtered off to recover the resultant product. Next, the filtered-off and recovered product was dispersed into water of 50° C. and then stirred for 15 minutes, thus washing this product with water. This washing step was repeated three times. Next, the resultant product was dried, calcined, and ground in the same way as of Example 3-9 to obtain a powder. To 20 kg of this powder, there were added 1 kg of phenol resin (Belipearl (trade name), produced by Kanebo Co.) and 0.5 kg of starch (as a molding assistant) to mix them together. The resulting mixture was kneaded with a kneader. The kneaded product was molded into a honeycomb structure of the same shape as of Example 3-9 with an extrusion molding machine, and then dried and calcined in the same way as of Example 3-9, thus obtaining the honeycomb support.

This honeycomb support was impregnated with a mixed solution of hexaammineplatinum hydroxide and magnesium acetate, and then dried, and then calcined at 450° C. for 2 hours under air atmosphere to obtain a catalyst d.

The composition of the catalyst d was (Ti—Si-composite oxide):S:Mg:Pt=98.6:0.2:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-13

The honeycomb support, as produced in the same way as of Example 3-12, was immersed into a 4.3 weight % aqueous sulfuric acid solution, and then dried, and then calcined at 400° C. for 2 hours under air atmosphere, and subsequently further impregnated with a mixed solution of hexaammineplatinum hydroxide and magnesium acetate, and then dried, and then calcined at 450° C. for 2 hours under air atmosphere, thus obtaining a catalyst e.

The composition of the catalyst e was (Ti—Si-composite oxide):S:Mg:Pt=98.0:0.9:1:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-14

The gel, as obtained in the same way as of Example 3-9, was left alone for 3 hours, and then filtered off to recover the resultant product. Next, the filtered-off and recovered product was dispersed into water of 25° C. and then stirred for 5 minutes, thus washing this product with water. This washing step was carried out only one time. A catalyst f was obtained in the same way as of Example 3-9 except that the washing step was modified in the above way.

The composition of the catalyst f was (Ti—Si-composite oxide):S:Pt=96.7:2.2:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

EXAMPLE 3-15

To 20 kg of the Ti—Si-composite oxide as prepared in Example 3-9, there were added 1,880 g of a 90 weight % aqueous orthophosphoric acid solution, 1 kg of phenol resin (Bellpearl (trade name), produced by Kanebo Co.) and 0.5 kg of starch (as a molding assistant) to mix them together. The resulting mixture was kneaded with a kneader. The kneaded product was molded into a honeycomb structure of the same shape as of Example 3-9 with an extrusion molding machine, and then dried and calcined in the same way as of Example 3-9, thus obtaining the honeycomb support.

This honeycomb support was impregnated with a tungstic acid solution, and then dried, and then calcined at 450° C. for 2 hours under air atmosphere, and subsequently further impregnated with a boiled mixed solution of hexaammineplatinum hydroxide and magnesium acetate, and then dried, and then calcined at 450° C. for 2 hours under air atmosphere, thus obtaining a catalyst g.

The composition of the catalyst g was (Ti—Si-composite oxide):Mg:P:W:S:Pt=94.4:1:2.5:1.5:0.5:0.1 (weight ratio). From the result of EPMA sectional linear analysis into Pt, it was verified that not less than 90 weight % of the total quantity of the supported Pt was distributed in the range of from surfaces to a depth of 100 μm. From the result of measurement with a transmission electron microscope, the average particle diameter of Pt was smaller than 5 nm.

—Purification of CO-Containing Exhaust Gases—

CO-containing exhaust gases were brought into contact with the catalysts A-Z and a-g, as produced in Examples 1-1 to 1-8, 2-1 to 2-8 and 3-1 to 3-15 and Comparative Examples 1-1 to 1-2, to carry out CO-removing purification, thereby determining its removing ratio. Incidentally, in addition to CO-removing purification as carried out with the catalysts that were in a state of new products after their production, CO-removing purification was carried out under the same conditions also with regard to cases of using the catalysts after their exposure treatment with $SO_x$-containing gases and cases of using the catalysts after exhaust gases with high temperature had been passed through the catalysts for a long time (cases of using the catalysts after their high-temperature treatment).

Furthermore, CO-containing exhaust gases further containing acetaldehyde or $SO_2$ were brought into contact with the above catalysts to also determine the acetaldehyde-removing ratio and the $SO_2$-oxidizing ratio.

<CO-Removing Purification>:

(CO-Removing Purification):

CO-removing purification was carried out with the catalysts that were in a state of new products after their production.

Purification Conditions:
Composition of exhaust gases=CO: 20 ppm, $O_2$: 10%, $H_2O$: 8%, $N_2$: Balance
Gas temperature=: 340° C.
Space velocity (STP)=75,000 $H^{-1}$
CO-removing ratio calculation equation:

CO-removing ratio (%)=[{(CO concentration at inlet of reactor)−(CO concentration at outlet of reactor)}/(CO concentration at inlet of reactor)]×100

(CO-removing purification using the catalysts after their exposure treatment):
As to the catalysts after the above CO-removing purification, their exposure treatment with $SO_x$-containing gases was carried out under the below-mentioned conditions. Then, the above CO-removing purification was carried out by using the resultant catalysts.
Exposure treatment conditions:
Composition of exposure gases=$SO_2$: 50 ppm, $O_2$: 10%, $H_2O$: 8%, $N_2$: Balance
Gas temperature=: 340° C.
Space velocity (STP)=75,000 $H^{-1}$
Exposure time=: 500 hours
(CO-removing purification using the catalysts after their high-temperature treatment):
The temperature of the exhaust gases in the above CO-removing purification was raised to 400° C., and the resultant exhaust gases were passed through the catalysts, which were in a state of new products, for 600 hours, thus carrying out the high-temperature treatment. Then, the above CO-removing purification was carried out by using the resultant catalysts.
<Acetaldehyde-Removing Purification>:
Purification conditions:
Composition of exhaust gases=$CH_3CHO$: 20 ppm, CO: 20 ppm, $O_2$: 12%, $H_2O$: 8%, $N_2$: Balance
Gas temperature=: 350° C.
Space velocity (STP)=80,000 $H^{-1}$
Acetaldehyde-removing ratio calculation equation:

Acetaldehyde-removing ratio (%)=[{(acetaldehyde concentration at inlet of reactor)−(acetaldehyde concentration at outlet of reactor)}/(acetaldehyde concentration at inlet of reactor)]×100

<Measurement of $SO_2$-Oxidizing Ratio>:
Measurement conditions:
Composition of exhaust gases=$SO_2$: 30 ppm, CO: 20 ppm, $O_2$: 12%, $H_2O$: 8%, $N_2$: Balance
Gas temperature=: 350° C.
Space velocity (STP)=80,000 $H^{-1}$
$SO_2$-oxidizing ratio calculation equation:

$SO_2$-oxidizing ratio (%)={($SO_3$ concentration at outlet of reactor) /($SO_2$ concentration at inlet of reactor)}×100

The results of the above purification of the CO-containing exhaust gases are collectively shown in Tables 1 and 2 below.

TABLE 1

| Example Comparative Example | Honeycomb Catalyst support | Catalytic component etc. A | B | C | Others | CO-removing ratio (%) New product | After $SO_x$ exposure treatment | After high-temperature treatment | Acetaldehyde-removing ratio (%) | $SO_2$-oxidizing ratio (%) |
|---|---|---|---|---|---|---|---|---|---|---|
| Example 1-1 | A Ti—Si | Pt | | | | 83 | | | 78 | |
| Example 1-2 | B Ti—Si | Pt | | | | 86 | 79 | | 81 | 6.5 |
| Example 1-3 | C TiO$_2$ | Pt | | | | 80 | | | 71 | |
| Example 1-4 | D TiO$_2$ | Pt | | | | 82 | | | 74 | |
| Example 1-5 | E TiO$_2$ | Pt | | | | 74 | | | 66 | |
| Example 1-6 | G Ti—Si | Pt | | | | 76 | | | 70 | |
| Example 1-7 | I Ti—Si | Pt, Pd | | | | 77 | | | 73 | |
| Example 1-8 | J Ti—Si | Pt | | W | | 88 | | | 81 | |
| Comparative Example 1-1 | F TiO$_2$ | Pt | | | | 57 | | | 49 | |
| Comparative Example 1-2 | H Al$_2$O$_3$ | Pt | | | | 46 | 22 | | 35 | 16 |
| Example 2-1 | K Ti—Si | Pt | | | Mg | 95 | 94 | 91 | 85 | 2.5 |
| Example 2-2 | L Ti—Si | Ru | | | Ce | 82 | | | 79 | |
| Example 2-3 | M Ti—Si | Pt | | | Ca | 94 | | | | |
| Example 2-4 | N Ti—Si | Pt | | | Na | 93 | | | | |
| Example 2-5 | O Ti—Si | Pt | | | Li | 93 | | | | |
| Example 2-6 | P Ti—Si | Pt | | | Y | 92 | | | | |
| Example 2-7 | Q Ti—Si | Pt | | | La | 94 | | | | |
| Example 2-8 | R Ti—Si | Pt | | | Ce | 93 | | | | |

TABLE 2

| Example | Honeycomb Catalyst support | Catalytic component etc. A B C | Others | CO-removing ratio (%) New product | After $SO_x$ exposure treatment | After high-temperature treatment | Acetaldehyde-removing ratio (%) | $SO_2$-oxidizing ratio (%) |
|---|---|---|---|---|---|---|---|---|
| Example 3-1 | S Ti—Si | Pt | P | 88 | | | | |
| Example 3-2 | T Ti—Si | Pt Mg | P | 95 | | | | |

TABLE 2-continued

| | | Catalytic component etc. | | | | | CO-removing ratio (%) | | | |
|---|---|---|---|---|---|---|---|---|---|---|
| | | | | | | | | After | | SO$_2$- |
| | Honeycomb | | | | | | After SO$_x$ | high-temperature | Acetaldehyde-removing ratio | oxidizing ratio |
| Example | Catalyst support | A | B | C | Others | New product | exposure treatment | treatment | (%) | (%) |
| Example 3-3 | U | Ti—Si | Pt | Mg | | P | 95 | | 95 | 84 | 3.6 |
| Example 3-4 | V | Ti—Si | Pt | Mg | | P | 94 | | | | |
| Example 3-5 | W | Ti—Si | Pt | Ca | | P | 95 | | | | |
| Example 3-6 | X | TiO$_2$ | Pt | | | P | 82 | | | | |
| Example 3-7 | Y | Ti—W | Pt | Y | | P | 92 | | | | |
| Example 3-8 | Z | Ti—Si | Pt | Mg | | P | 78 | | 74 | | |
| Example 3-9 | a | Ti—Si | Pt | | | S | 83 | | | 82 | |
| Example 3-10 | b | TiO$_2$ | Pt | | | S | 82 | | | 79 | |
| Example 3-11 | c | Ti—Si | Pt | Mg | | S | 95 | 94 | | 86 | 2.3 |
| Example 3-12 | d | Ti—Si | Pt | Mg | | S | 95 | | | 86 | |
| Example 3-13 | e | Ti—Si | Pt | Mg | | S | 89 | | | 79 | |
| Example 3-14 | f | Ti—Si | Pt | | | S | 74 | | | 66 | |
| Example 3-15 | g | Ti—Si | Pt | Mg | W | P, S | 95 | | 95 | 86 | 3.0 |

From the above results, it was verified that the catalysts of the Examples can display very excellent CO-removal efficiency when compared with those of the Comparative Examples. Also as to the acetaldehyde-removal efficiency, the catalysts of the Examples are understood as very excellent when compared with those of the Comparative Examples. As to the catalysts of the Examples when compared with those of the Comparative Examples, the oxidation of SO$_2$ is involved much less and is therefore sufficiently suppressed. Furthermore, it was verified that: as to the catalysts of the Examples when compared with those of the Comparative Examples, the CO-removal efficiency is not deteriorated even after their long-time exposure treatment with the SO$_2$-containing gases, and the SO$_x$ resistance is therefore more excellent. In addition, it was verified that: as to the catalysts of the Examples, the CO-removal efficiency is not deteriorated even after the long-time passage of the exhaust gases with high temperature through the catalysts, and is therefore more excellent.

EXAMPLE 4-1

CO- and NO$_x$-removing purification was carried out in the following way. In an apparatus for purification of exhaust gases, the catalyst U as obtained in Example 3-3 was placed on the gas inlet side in an exhaust gas flow direction, and a vanadium-tungsten-containing DeNO$_x$ catalyst was placed on the gas outlet side. While NH$_3$ was supplied as a reducing agent from between the catalyst U and the DeNO$_x$ catalyst into the apparatus in the below-mentioned used amount, exhaust gases containing CO and NO were passed through the catalyst layers.

Before and after the above purification, the exhaust gases were analyzed to measure the CO-removing ratio, the NO-removing ratio, and the NH$_3$-remaining ratio. The results are shown in Table 3. Incidentally, the specific purification conditions and the calculation equations are shown below.

EXAMPLE 4-2

CO- and NO$_x$-removing purification was carried out in the following way. In an apparatus for purification of exhaust gases, a vanadium-tungsten-containing DeNO$_x$ catalyst was placed on the gas inlet side in an exhaust gas flow direction, and the catalyst U as obtained in Example 3-3 was placed on the gas outlet side. While NH$_3$ was supplied as a reducing agent from upstream of the DeNO$_x$ catalyst into the apparatus in the below-mentioned used amount, exhaust gases containing CO and NO were passed through the catalyst layers.

Before and after the above purification, the exhaust gases were analyzed, in the same way as of Example 4-1, to measure the CO-removing ratio, the NO-removing ratio, and the NH$_3$-remaining ratio. The results are shown in Table 3.

<CO- and NO$_x$-Removing Purification>:
Purification Conditions:
Composition of exhaust gases=CO: 20 ppm, NO: 20 ppm, H$_2$O: 8%, O$_2$: 10%, N$_2$: Balance
Gas temperature=: 350° C.
Space velocity (STP) at catalyst U=75,000 H$^{-1}$
Space velocity (STP) at DeNO$_x$ catalyst=12,000 H$^{-1}$
Amount of reducing agent (ammonia: NH$_3$) as used=1.0 (NH$_3$/NO (molar ratio))
CO-removing ratio calculation equation:

CO-removing ratio (%)=[{(CO concentration at inlet of reactor)−(CO concentration at outlet of reactor)}/(CO concentration at inlet of reactor)]×100

NO-removing ratio calculation equation:

NO-removing ratio (%)=[{(NO concentration at inlet of reactor)−(NO concentration at outlet of reactor)}/(NO concentration at inlet of reactor)]×100

NH$_3$-remaining ratio calculation equation:

NH$_3$-remaining ratio (%)={(NH$_3$ concentration at outlet of reactor)/(NH$_3$ concentration at inlet of reactor)}×100

TABLE 3

| Example | Arrangement of catalysts | CO-removing ratio (%) | NO-removing ratio (%) | NH3-remaining ratio (%) |
|---|---|---|---|---|
| Example 4-1 | Catalyst U⇒ DeNO$_x$ catalyst | 95 | >99 | 0 |
| Example 4-2 | DeNO$_x$ catalyst⇒ catalyst U | 95 | >99 | 0 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A catalyst for purification of exhaust gases, which is a catalyst for purification of CO-containing exhaust gases, comprising:
a metal oxide as a support and a catalytic component A being supported thereon as a catalytic component and including at least one noble metal element selected from the group consisting of Pt, Pd, Rh, Ru, Ir, and Au, and a catalytic component B including at least one Group I to Group III metal elements as another catalytic component supported on the support;
wherein the support includes, as the metal oxide, titanium oxide and/or a composite oxide of Ti and at least one metal element selected from the group consisting of Si, Al, W, and Zr and is a monolithically molded type porous honeycomb support which is obtained by a process including the steps of extrusion-molding and then calcining materials of the support; and
wherein the catalytic component A is distributed with a quantitatively great inclination toward surfaces of the catalyst and said catalytic component B is distributed substantially evenly throughout the entire catalyst.

2. A catalyst according to claim 1, further comprising a catalytic component C including at least one element selected from the group consisting of V, W, Mo, Cu, Mn, Ni, Co, Cr, and Fe as another catalytic component supported on the support.

3. A catalyst according to claim 1, further comprising a compound of at least one element selected from the group consisting of B, P, Sb, Pb, Sn, Zn, and In in the range of not more than 10 weight % in terms of atom of the selected element relative to the entity of the catalyst.

4. A catalyst according to claim 1, further comprising a sulfur compound in the range of not more than 1 weight % in terms of sulfur atom relative to the entity of the catalyst.

5. A process for purification of exhaust gases, which is a process for purification of exhaust gases to remove CO therefrom, comprising the step of bringing the exhaust gases into contact with the catalyst as recited in claim 1.

6. A process according to claim 5, wherein the exhaust gases further contains $NO_x$.

7. A process according to claim 6, further comprising the step of bringing the exhaust gases into contact with a catalyst for removal of nitrogen oxides in the presence of a reducing agent before and/or after the step of bringing the exhaust gases into contact with the catalyst as recited in claim 1.

8. A process according to claim 5, wherein the exhaust gases are exhaust gases having a CO concentration of not higher than 100 ppm.

9. A catalyst according to claim 1, wherein not less than 70 weight % of the catalytic component A is distributed on the outer surfaces of the support to a depth of 100 μm.

10. A catalyst according to claim 1, wherein not less than 95 weight % of the catalytic component A is distributed with a great inclination toward the outer surfaces of the support to a depth of 100 μm.

11. A catalyst according to claim 1, wherein said catalytic component A is present in the range of 0.005 to 2.0 weight % based on the weight of the catalyst.

12. A catalyst according to claim 1, wherein said catalytic component A has an average particle diameter of not larger than 30 nm.

13. A catalyst according to claim 1, wherein said catalytic component A has an average particle diameter of not larger than 20 nm.

14. A catalyst according to claim 1, wherein said catalytic component B is present in an amount not greater than 20 weight % based on the weight of the entire catalyst.

* * * * *